(12) United States Patent
Nill et al.

(10) Patent No.: US 12,372,933 B2
(45) Date of Patent: **\*Jul. 29, 2025**

(54) COMMUNICATING WITH AND CONTROLLING LOAD CONTROL SYSTEMS

(71) Applicant: Lutron Technology Company LLC, Coopersburg, PA (US)

(72) Inventors: John B. Nill, North Wales, PA (US); Matthew Bamberger, Quakertown, PA (US); Jason M. Swails, Nazareth, PA (US); Christopher M. Jones, Downingtown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,149

(22) Filed: Jan. 8, 2024

(65) Prior Publication Data

US 2024/0345557 A1  Oct. 17, 2024

Related U.S. Application Data

(63) Continuation of application No. 17/888,250, filed on Aug. 15, 2022, now Pat. No. 11,868,111, which is a continuation of application No. 16/893,060, filed on Jun. 4, 2020, now Pat. No. 11,415,954, which is a continuation of application No. 15/908,322, filed on Feb. 28, 2018, now Pat. No. 10,678,203.

(60) Provisional application No. 62/485,212, filed on Apr. 13, 2017, provisional application No. 62/465,433, filed on Mar. 1, 2017, provisional application No. 62/464,834, filed on Feb. 28, 2017.

(51) Int. Cl.
| | |
|---|---|
| G05B 19/042 | (2006.01) |
| H02J 13/00 | (2006.01) |
| H04L 12/28 | (2006.01) |
| H04L 67/025 | (2022.01) |
| H04L 67/12 | (2022.01) |

(52) U.S. Cl.
CPC ...... *G05B 19/042* (2013.01); *H02J 13/00007* (2020.01); *H04L 12/2823* (2013.01); *H04L 12/2825* (2013.01); *H04L 67/025* (2013.01); *H04L 67/12* (2013.01); *G05B 2219/2639* (2013.01); *H02J 2310/14* (2020.01); *Y02B 70/30* (2013.01); *Y02B 90/20* (2013.01); *Y04S 20/20* (2013.01); *Y04S 20/221* (2013.01); *Y04S 20/242* (2013.01); *Y04S 40/121* (2013.01)

(58) Field of Classification Search
None
See application file for complete search history.

(56) References Cited

U.S. PATENT DOCUMENTS

| | | | |
|---|---|---|---|
| 4,667,193 | A | 5/1987 | Cotie et al. |
| 5,544,036 | A | 8/1996 | Brown, Jr. et al. |
| 6,119,125 | A | 9/2000 | Gloudeman et al. |

(Continued)

FOREIGN PATENT DOCUMENTS

| | | |
|---|---|---|
| WO | 2016057548 A1 | 4/2016 |
| WO | 2016070628 A1 | 5/2016 |

*Primary Examiner* — Abdullahi E Salad
(74) *Attorney, Agent, or Firm* — Glen R. Farbanish; Philip N. Smith; Michael S. Czarnecki

(57) ABSTRACT

Systems and methods are disclosed for communicating with and controlling load control systems of respective user environments from locations that are remote from the user environments.

18 Claims, 5 Drawing Sheets

(56) References Cited

U.S. PATENT DOCUMENTS

| | | |
|---|---|---|
| 6,640,141 B2 | 10/2003 | Bennett |
| 7,349,682 B1 | 3/2008 | Bennett, III et al. |
| 7,634,322 B2 | 12/2009 | Samudrala et al. |
| 7,873,441 B2 | 1/2011 | Synesiou et al. |
| 8,443,071 B2 | 5/2013 | Lu et al. |
| 8,532,839 B2 | 9/2013 | Drees et al. |
| 8,731,724 B2 | 5/2014 | Drees et al. |
| 8,788,097 B2 | 7/2014 | Drees et al. |
| 8,838,282 B1 | 9/2014 | Ratliff et al. |
| 9,553,451 B2 | 1/2017 | Zacharchuk et al. |
| 9,606,520 B2 | 3/2017 | Noboa et al. |
| 9,753,455 B2 | 9/2017 | Drees |
| 9,838,736 B2 | 12/2017 | Smith et al. |
| 9,839,101 B2 | 12/2017 | Clymer et al. |
| 9,851,735 B2 | 12/2017 | Bard et al. |
| 10,091,017 B2 | 10/2018 | Landow et al. |
| 10,098,074 B2 | 10/2018 | Baker et al. |
| 10,101,717 B2 | 10/2018 | Marten et al. |
| 10,129,047 B2 | 11/2018 | Voddhi et al. |
| 10,326,658 B2 | 6/2019 | Chen et al. |
| 2002/0152298 A1 | 10/2002 | Kikta et al. |
| 2003/0040812 A1 | 2/2003 | Gonzales et al. |
| 2003/0040813 A1 | 2/2003 | Gonzales et al. |
| 2005/0154494 A1* | 7/2005 | Ahmed .................. G05B 15/02 236/51 |
| 2006/0058923 A1 | 3/2006 | Kruk et al. |
| 2008/0040479 A1* | 2/2008 | Bridge .................... B60L 53/63 709/224 |
| 2008/0172312 A1 | 7/2008 | Synesiou et al. |
| 2008/0234837 A1* | 9/2008 | Samudrala ........... G05B 19/042 340/539.22 |
| 2009/0287805 A1* | 11/2009 | Hawkins ................. H04L 51/00 709/223 |
| 2010/0238001 A1 | 9/2010 | Veskovic |
| 2012/0022700 A1 | 1/2012 | Drees et al. |
| 2012/0056712 A1 | 3/2012 | Knode |
| 2012/0091213 A1 | 4/2012 | Altonen et al. |
| 2012/0150359 A1 | 6/2012 | Westergaard |
| 2012/0221163 A1 | 8/2012 | Forbes, Jr. |
| 2013/0253723 A1 | 9/2013 | Oh et al. |
| 2014/0001846 A1 | 1/2014 | Mosebrook et al. |
| 2014/0070790 A1 | 3/2014 | Fujiwara et al. |
| 2014/0180486 A1 | 6/2014 | Newman, Jr. et al. |
| 2014/0244040 A1* | 8/2014 | Alberth, Jr. ............ G05B 15/02 700/275 |
| 2014/0265863 A1* | 9/2014 | Gajurel ................ H05B 47/198 315/129 |
| 2014/0277753 A1 | 9/2014 | Eiynk et al. |
| 2014/0309758 A1 | 10/2014 | Morrow |
| 2015/0015377 A1 | 1/2015 | Bull et al. |
| 2015/0094825 A1 | 4/2015 | Kinoshita et al. |
| 2015/0160628 A1 | 6/2015 | Kalafut et al. |
| 2015/0179058 A1 | 6/2015 | Crafts et al. |
| 2015/0180678 A1 | 6/2015 | Nadeau |
| 2016/0028780 A1* | 1/2016 | Verzano .................. H04L 67/02 709/204 |
| 2016/0036896 A1 | 2/2016 | Spivey |
| 2016/0056629 A1* | 2/2016 | Baker ............... H02J 13/00004 315/307 |
| 2016/0127187 A1 | 5/2016 | Chen et al. |
| 2016/0225240 A1 | 8/2016 | Voddhi et al. |
| 2016/0320760 A1 | 11/2016 | Brun et al. |
| 2017/0090492 A1* | 3/2017 | Baker .................. G05B 19/042 |
| 2017/0090499 A1 | 3/2017 | Dolan |
| 2017/0191695 A1 | 7/2017 | Bruhn et al. |
| 2017/0244792 A1 | 8/2017 | Yin et al. |
| 2017/0279630 A1* | 9/2017 | Anderson .......... H05B 47/1965 |
| 2017/0345277 A1 | 11/2017 | Kurniawan et al. |
| 2018/0196402 A1 | 7/2018 | Glaser et al. |
| 2018/0270063 A1* | 9/2018 | Bard ....................... F24F 11/56 |
| 2019/0190741 A1 | 6/2019 | Wendt |

* cited by examiner

COMMUNICATING WITH AND CONTROLLING LOAD CONTROL SYSTEMS

CROSS-REFERENCE TO RELATED APPLICATIONS

This application is a continuation of U.S. patent application Ser. No. 17/888,250, filed Aug. 15, 2022, which is a continuation of U.S. patent application Ser. No. 16/893,060, filed Jun. 4, 2020, now U.S. Pat. No. 11,415,954, issued on Aug. 16, 2022, which is a continuation of U.S. patent application Ser. No. 15/908,322, filed Feb. 28, 2018, now U.S. Pat. No. 10,678,203, issued on Jun. 9, 2020, which claims the benefit of U.S. Provisional Patent Application No. 62/464,834, filed Feb. 28, 2017, claims the benefit of U.S. Provisional Patent Application No. 62/465,433, filed Mar. 1, 2017, and claims the benefit of U.S. Provisional Patent Application No. 62/485,212, filed Apr. 13, 2017. The entire disclosures of each of the foregoing applications are incorporated by reference herein.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

SUMMARY

It may be desirable to communicate with and control load control systems.

According to one example, a system may be configured to maintain a database configured to store entries corresponding to a plurality of load control systems including a first load control system and a second load control system. Each of the plurality of load control systems may be configured to control electrical loads for a respective environment. Each of the plurality of load control system may have a value and an identifier associated with it. The database may be configured for each of the plurality of load control systems to associate the value of the load control system with the identifier of the load control system. The first load control system may include a first value and a first identifier, and the second load control system may include a second value and a second identifier. The first load control system may be configured to communicate messages related to events that occur in the first load control system, and the second load control system may be configured to communicate messages related to events that occur in the second load control system. The system may be configured to receive from a network device a request to receive messages communicated by the first load control system. The request may include the first value associated with the first load control system. The system may be configured to receive a first message communicated by the first load control system. The first message may have associated with it the first identifier of the first load control system. Based at least in part on the request including the first value and the first message having associated with it the first identifier, the system may be configured to determine that the network device requested to receive the first message communicated by the first load control system. Based at least in part on determining that the network device requested to receive the first message, the system may be configured to communicate the first message to the network device.

According to another example, a system may be configured to receive from a network device a request to receive messages communicated by a load control system. The request may include a subscription request to a channel associated with the load control system. The load control system may be configured to control electrical loads for an environment. The load control system may be configured to publish messages to a message broker using a first topic and may be configured to receive messages from the message broker by subscribing with the message broker to a second topic. The system may be configured to receive via the message broker a first message communicated by the load control system. The first message may have the first topic associated with it, and the first message may be received via an HTTP interface. The system may be configured to determine that the first topic associated with the first message is correlated to the channel. Based at least in part on determining that the first topic associated with the first message is correlated to the channel, the system may be configured to determine that the network device requested to receive the first message communicated by the load control system. Based at least in part on determining that the network device requested to receive the first message, the system may be configured to communicate the first message to the network device.

According to a further example, a system may be configured to receive from a network device a request to subscribe to a channel associated with a first of a plurality of load control systems. Each of the plurality of load control systems may be configured to control electrical loads for a respective environment. Each of the plurality of the load control systems may be configured to publish messages to a message broker using a respective first topic and may be configured to receive messages from the message broker by subscribing with the message broker to a respective second topic. The channel associated with the first load control system may be correlated to the first and second topics of the first load control system. The request to subscribe to the channel associated with the first load control system may include a request to receive messages published by the first load control system to the first topic. The system may be configured to receive from a computing server a set of topics associated with a respective one or more of the plurality of load control systems. The computing server may be configured to receive from the message broker messages published by the one or more of the plurality of load control systems to the message broker, and may be further configured to determine the set of first topics based on the received messages. The received messages may include a first message published by the first load control system to the first topic associated with the first load control system. The set of topics may include the first topic associated with the first load control system. The system may be configured to determine that the set of topics received from the computing server includes the first topic associated with the first load control system, and that the network device requested to receive messages published by the first load control system to the first topic. Based at least in part on the determination, the system may be configured to communicate an indication to the computing server to forward the first message published by the first load control system. Responsive to communicating the indication, the system may receive from the computing server the first message published by the first load control system. The system may be configured to communicate to the network device the first message published by the first load control system.

The above advantages and features are of representative embodiments only. They are not to be considered limitations. Additional features and advantages of embodiments will become apparent in the following description, from the drawings, and from the claims.

DETAILED DESCRIPTION

Figure 1:
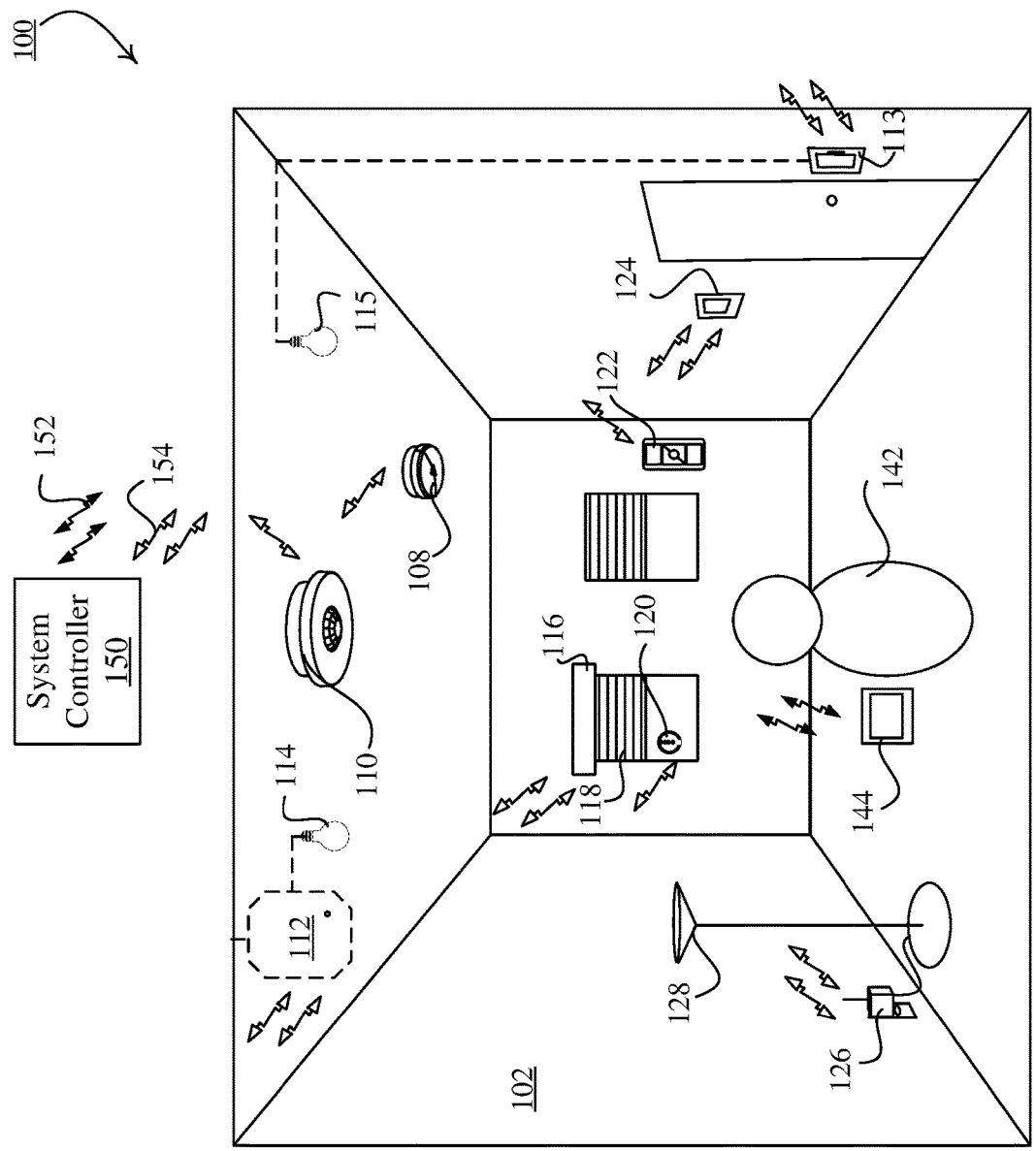
FIG. 1 is a system diagram that illustrates an example load control system that includes control-devices.

FIG. 1 shows a high-level diagram of an example load control system 100.

Load control system 100 may include a system controller 150 and load control devices for controlling (e.g., directly and/or indirectly) one or more electrical loads in a user environment 102 (also referred to herein as a load control environment). Example user environments/load control environments 102 may include one or more rooms of a home, one or more floors of a building, one or rooms of a hotel, etc. As one example, load control system 100 may enable the automated control of lighting systems, shades, and heating, ventilating, and air conditioning (HVAC) systems in the user environment, among other electrical loads.

The load control devices of load control system 100 may include a system controller 150, control-source devices (e.g., elements 108, 110, 120, and 122 discussed below), and control-target devices (e.g., elements 112, 113, 116, 124, and 126 discussed below) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used. "Digital" messages will be used herein for discussion purposes only.

The control-source devices may include, for example, input devices that are configured to detect conditions within the user environment 102 (e.g., user inputs via switches, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on a configuration of the load control system, and to then transmit digital messages to the control-target devices for the control-target devices to then control respective electrical loads. In other words, the control-source devices and the control-target device may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, a proprietary communication channel, such as CLEAR CONNECT™, etc. to directly communicate. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first need to be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message(s) to the control-target device (directly or through the system controller). The association message from the control-source device may include a unique identifier of the control-source device. The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive configuration instructions from a user that specify which control-source devices should control which control-target devices. Thereafter, the system controller may communicate this configuration information to the control-source devices and/or control-target devices.

As one example of a control-target device, load control system 100 may include one or more lighting control devices, such as the lighting control devices 112 and 113. The lighting control device 112 may be a dimmer, an electronic switch, a ballast, a light emitting diode (LED) driver, and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., thermostat) for directly controlling an HVAC system (not shown). The load control system 100 may also, or alternatively, include an audio control device (e.g., a speaker system) and/or a video control device (e.g., a device capable of streaming video content). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device(s)). A control-target device may communicate such messages to confirm receipt of messages and actions taken, to report status (e.g., light levels), etc. Again, control-target devices may also or alternatively communicate via wired communications.

With respect to control-source devices, the load control system 100 may include one or more remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices for controlling an electrical load. The remote-control device 122 may send digital messages for controlling one or more control-target devices after actuation of one or more buttons on the remote-control device 122. One or more buttons may correspond to a preset scene for controlling the lighting load 115, for example. The occupancy sensor 110 may send digital messages to control-target devices in response to an occupancy and/or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the user environment 102. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level. The load control system 100 may include one or more other control-source devices. Again, one will recognize that control-source devices may also or alternatively communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. It may communicate programming/configuration information to the control devices. It may also be the source of control messages to control-target devices, for example, instructing the devices to control corresponding electrical loads. As one example of the later, the system controller may run one or more time-clock operations that automatically communicates messages to control-target devices based on configured schedules (e.g., commands to lighting control device 113 to adjust light 115, commands to motorized window treatment 116 for directly controlling the covering material 118, etc.) Other examples are possible.

According to a further aspect of load control system 100, the system controller 150 may be configured to communicate with one or more network devices 144 in use by a user(s) 142, for example. The network device 144 may include a personal computer (PC), a laptop, a tablet, a smart phone, or equivalent device. The system controller 150 and the network device 144 may communicate via a wired and/or wireless communications network. The communications network may be the same network used by the system controller and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible such as the system controller acting as an access point and providing one or more wireless/wired based networks through which the system controller and network device may communicate.

In general, the system controller 150 may be configured to allow a user 142 of the network device 144 to determine, for example, the configuration of the user environment 102 and load control system 100, such as rooms in the environment, which control devices are in which rooms (e.g., the location of the control devices within the user environment, such as which rooms), to determine the status and/or configuration of control devices (e.g., light levels, HVAC levels, shade levels), to configure the system controller (e.g., to change time clock schedules), to issue commands to the system controller in order to control and/or configure the control devices (e.g., change light levels, change HVAC levels, change shade levels, change presets, etc.), etc. Other examples are possible.

The load control system 100 of FIG. 1 may be configured such that the system controller 150 is only capable of communicating with a network device 144 when that device is local to the system controller, in other words, for the two to directly communicate in a point-to-point fashion or through a local network specific to the user environment 102 (such as a network provided by a router that is local to the user environment). It may be advantageous to allow a user of network device 144 to communicate with the system controller 150 and to control the load control system 100 from remote locations, such as via the Internet or other public or private network. Similarly, it may be advantageous to allow third-party integrators to communicate with the system controller 150 in order to provide enhanced services to users of user environment 102. For example, a third-party integrator may provide other systems within user environment 102. It may be beneficial to integrate such systems with load control system 100.

Figure 2:
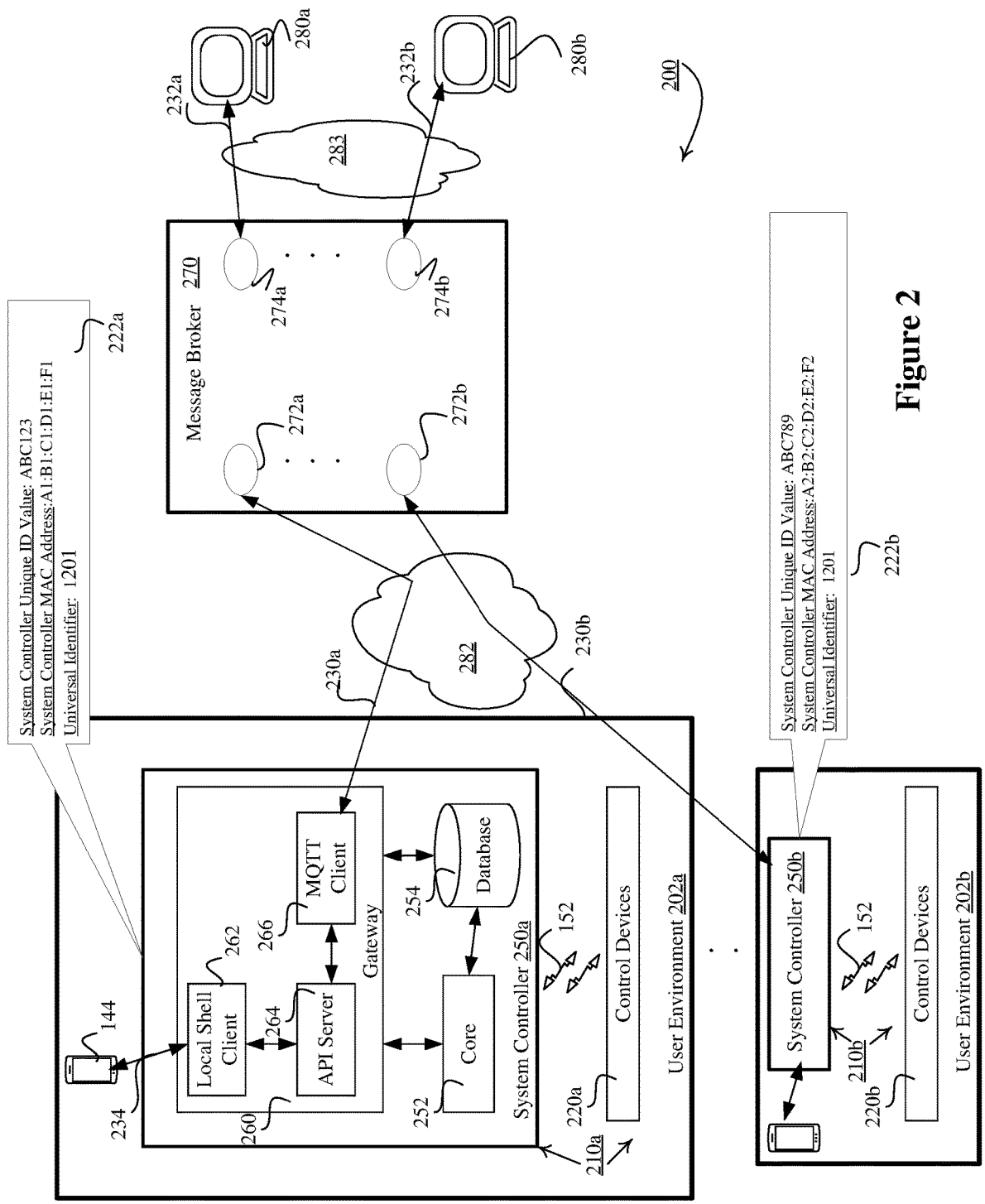
FIG. 2 is a system diagram that illustrates a system for communicating with and/or controlling a load control system using messaging based interfaces.

Referring now to FIG. 2 there is shown an example system 200. System 200 may include one or more user environments as represented by user environments 202a and 202b. More specifically, system 200 may be configured to support numerous user environments, with only two user environments 202a and 202b shown to assist in describing system 200. Each user environment may be substantially the same, each including a respective load control system 210a and 210b that includes a respective system controller 250a and 250b and respective control devices 220a and 220b (e.g., control-source devices and/or control-target devices). In general, the system controller 250a and 250b and control devices 202a and 202b of load control systems 210a and 210b may functionally operate similar to system controller 150 and the control devices as discussed with respect to FIG. 1. Each user environment 202a and 202b of system 200 may differ in that the user environments may be owned by different entities. For example, each user environment may be a residential home owned by respectively different users/homeowners, may be a business, etc. or come combination thereof. For description purposes only, user environments 202a and 202b may be referred to herein as residential homes that are owned/rented by home-owners. Hence, each user environment may include different control devices and different configurations of these control devices and system controllers. In this fashion, system 200 may include numerous different homes, for example. As compared to load control system 100, system 200 may include systems for a user and/or third party to interface with a load control system 210a/210b from a location remote from the respective user environments 202a/202b, such as over the Internet or other private or public network.

As indicated, each user environment 202a and 202b of system 200 may include a respective system controller 250a and 250b (although a user environment may include more than one system controller) and control devices, collectively represented as elements 220a and 220b (again, system controller 250a and control devices 220a may make up load control system 210a, and system controller 250b and control devices 220b may make up load control system 210b). System 200 may also include one or more message brokers 270 and one or more network devices 280a and 280b. Network devices 280a and 280b may represent computing devices in use by respective users of respective user environments 202a and 202b. For example, network device 280a may be a device (e.g., a phone, PC, a laptop, a tablet, a smart phone, or equivalent device) in use by a home-owner of user environment 202a, and network device 280b may be a device (e.g., a phone, etc.) in use by a home-owner of user environment 202b. As another and/or additional example, network devices 280a and 280b may be third-party integrators that provide services to respective users/home-owners of user environments 202a and 202b. Here, network devices 280a and 280b may each be one or more computing servers for example. Again, system 200 may include numerous network devices 280a and 280b, with only two being shown for description purposes. According to system 200, network devices 280a and 280b may be remote from the user environments (e.g., not located within the user environments). Nonetheless, network devices 280a and 280b may also be local to the user environments (e.g., located within the user environments) and communicate with system controllers 250a and/or 250b using the message broker 270 as described below.

System 200 may also include networks 282 and 283, which may include private and/or public networks, such as the Internet. Networks 282 and 283 may at least in part be the same network. In general, system controllers 250a and 250b may be configured to communicate via network 282 with message broker 270, and each network device 280a and 280b may be configured to communicate via network 283 with the message broker 270. Through the use of the message broker 270 and other mechanisms described herein, a network device 280a, for example, may communicate with a system controller 250a of user environment 202a, for example, and interact with the control devices 220a of that environment. As one example of system 200, a user may use network device 280a to communicate with system controller 250a and through these communications, may determine, for example, the configuration of the load control system 210a/user environment 202a (e.g., such as rooms in the environment and the location of the control devices within the user environment, such as which rooms), to determine the status and/or configuration of control devices 220a (e.g. light levels, HVAC levels, shade levels), to configure the system controller 250a (e.g., to change time clock schedules), to issue commands to the system controller 250a to control and/or configure the control devices 220a (e.g., change light levels, change HVAC levels, change shade levels, change presets, etc.). These are merely examples. As another example, a network device 280a that is operated by a third-party integrator may communicate with system controller 250a to determine the status of and to control the load control system 210a (as described herein), and to also use this functionality to integrate the features of load control system 210a with features of another system in the user environment 202a that the third-party integrator may have control over. As one example, a third-party integrator may be a home security provider and in response to detecting an issue in the user environment 202a through a system provided by the third-party integrator (e.g., an alarm system), instruct the system controller 250a to actuate lights in the user environment. Other examples are possible. For example, a third-party integrator may provide one or more voice/speaker-based devices that are located in the user environment 202a. A user may audibly interface with such a device (e.g., through voice commands) which in turn may communicate with a network device 280a (e.g., a computing server of the third-party integrator). Network device 280a may in turn communicate with system controller 250a to control the load control system 210a based on how the user interfaced with the voice/speaker-based device. Alternatively, network device 280a may communicate with system controller 250a to determine the status of the load control system 210a and in turn may communicate with the voice/speaker-based device to audibly report the status to the user. Again, this is one example. In similar fashions, users and third-party integrators may communicate with any user environment of system 200.

Referring more specifically now to system controller 250a (system controller 250b may be similarly configured), it may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (not shown) (hereinafter collectively referred to as processor(s)), for example. The processor(s) of system controller 250a may be configured to execute one or more software-based applications and/or firmware based modules that include instructions that when executed by the processor(s), may configure the processor(s) to perform signal coding, data processing, input/output processing, or any other functions and/or features of the system controller as described herein. These features and functions are represented in part by modules 252 and 260 in FIG. 2, which are further described below. Modules 252 and 260 may execute as one or more software-based processes, for example. One will also recognize that features, functions, and processes described herein may also and/or alternatively be provided by hardware in addition to and/or as an alternative to software-based instructions and processes. System controller 250a may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute the applications. System controller 250a may also include one or more communication interfaces/transceivers/network interface devices (not shown) communicatively coupled to the processors and/or memory devices/modules. The communication interfaces may allow system controller 250a to communicate over one or more wired and/or wireless communication networks. As one example, the communication interfaces may allow system controller 250a to communicate wirelessly with control devices 220a as similarly described for load control system 100. The communication interfaces may also allow the system controller 250a to communicate wirelessly and/or via a wired connection(s) with a router (not shown), for example, that is local to user environment 202a and that provides the user environment with a local network. Through this local network, the system controller 250a may communicate with a network device 144 that is local to the user environment 202a, and may also communicate and with network 282 (such as through an Internet service provider, not shown). System controller 250a may also include one or more databases 254 as further described herein. These databases may be flat databases, relational/SQL databases. NoSQL/non SQL databases, and/or a time series databases, etc. . . . although any form of database(s) may be used. System controller 250a may also include one or more user interfaces such a display monitor, keyboard, mouse, speakers, audio receivers, etc. While system controller 250a is shown as having example modules 252 and 260 and example database 254, the system controller may include fewer, other, and/or additional modules and databases.

Referring more specifically to modules 252 and 260 and to database 254, database 254 may maintain configuration information of the load control system 250a. This information may include, for example, the control devices 220a of the load control system, the configuration of the user environment 202a such as rooms in the environment, which control devices 220a are in which rooms, communication addresses of the control devices needed to communicate with the devices, which control-source devices may be controlled by/associated with which control-target devices, configuration information of the control devices (e.g., button scene configurations, occupancy/vacancy sensor configurations, etc.), system configurations such as time clock schedules, etc. The database may also maintain status information of the control devices (e.g., error conditions, light levels, shade levels, HVAC levels, power consumption levels, etc.). The database may also maintain event-based information, as referred to below, which may include a record of events as they occur within the system. These are merely examples, and other and/or additional or less information may be possible.

Module 252 may be referred to herein as the core module or core 252 for description purposes and may be configured to execute as one or more software based processes. Core 252 may be configured to act as a communications module between the control devices 220*a* and the system controller, assisting in and/or monitoring communications between control-source devices and control-target devices and storing related information in database 254. This information may include, for example, changes to which control-source devices are associated with which control-target devices. The information may also include event-based information, such as (i) events detected by control-source devices (e.g., occupancy/vacancy as detected by sensor 110, light levels as detected by sensors 108 and 120, detection of buttons actuated on remote control devices 113 or wall panels/switches 113, etc.), (ii) commands communicated by control-source devices to control-target devices to alter settings based on detected events (e.g., changes to light levels, shade levels, HVAC levels, etc.), and (iii) commands from control-target devices indicting/confirming altered settings. Core 252 may receive status messages directly from control devices, such as error conditions, light levels, shade levels, HVAC levels, power consumption levels, occupancy/vacancy conditions, etc. and store such information in database 254. Core 252 may also run time clock schedules, and communicate messages to the control devices in accordance with those schedules. Again, core 252 may store such changes to the control devices and/or acknowledgements from the control devices in database 254. Core 252 may also communicate information/messages to module 260 (which may be referred to as the gateway module or gateway 260 for description purposes) as described below. Core 252 may receive messages from the gateway 260 that may result in the core changing configuration parameters of the system controller (e.g., time clock settings), or communicating messages to the control devices (such as changes to light levels), or adjusting configuration/operating parameters of the control devices (e.g., change scene buttons on switch buttons, occupancy/vacancy sensor configurations), etc. Core 252 may respond back to the gateway 260 after it performs such operations. Core 252 may also receive from the gateway 260 requests for any of the information stored in the database 254 as discussed above, and report that information back to the gateway. These are examples and core 252 may perform other and/or additional functions and operations.

Turning to gateway 260, it may be configured to act as an interface between the system controller 250*a* and external devices, such as local network device 144 situated in the user environment 202*a* and remote network devices 280*a* and 280*b*. For example, gateway 260 may receive messages from network device 144 and/or network devices 280*a* and/or 280*b* and route those messages within the system controller 250*a*, such as to core 252 for execution. Gateway 260 may also receive responses to such messages, such as from core 252, and route them back to the network devices 144, 280*a* and/or 280*b*. Gateway 260 may also receive, for example, status and event based information, such as from core 252, and route that information to network devices 144, 280*a* and/or 280*b*. These are examples and other examples are possible. To perform such functions and operations, gateway 260 may include an API (application programming interface) server 264, a local shell client (also referred to herein as shell client) 262, and an MQTT (message queue telemetry transport) client 266. Each of the API server 264, the local shell client 262, and the MQTT client 266 may operate as one or more software based processes within the system controller 250*a*, although other configurations are possible. One will recognize that the names API server, local shell client, and MQTT client as used herein are for description purposes only.

Local shell client 262 may be configured to function or operate as an interface point to network devices 144 that are local to the system controller 250*a* (e.g., that are on the same local network as the system controller and/or are located in within user environment 202*a*). Local shell client 262 may be configured to support a communications connection 234 with network device 144. This connection may be, for example, a TCP/IP (transmission control protocol/internet protocol) or UDP/IP (user datagram protocol) based connection, although other connections may be used. Local shell client 262 may provide a shell type interface (e.g., a command-line type interface) to network device 144 over the connection. The interface may be a secure shell interface (e.g., use the secure shell (SSH) protocol). One will recognize that while local shell client 262 is described herein as an interface point to network devices 144 that are local to the system controller 250*a*, a network device that is on a different network as the system controller (i.e., not on the same local network as the system controller) and/or not located in within user environment 202*a* may also use local shell client 262 to communicate with the system controller.

MQTT client 266 may be configured to function or operate as an interface point to the message broker 270 and therefore as an interface point to network devices 280*a* and/or 280*b* that are remote to the system controller 250*a*. MQTT client 266 may support a communications connection 230*a* with the message broker 270. This connection may be, for example, a TCP/IP based connection although other connections may be used. On top of this connection the MQTT client 266 may support the MQTT publish-subscribe-based messaging protocol, for example, with the message broker 270, with the MQTT client 266 acting as a client to the broker. As further described below, MQTT client 266 may send messages out of the system controller to the message broker and thus to network devices 280*a* and/or 280*b* by publishing messages to one or more defined topics, as that term is used in messaging based protocols. Similarly, MQTT client 266 may receive messages from the message broker that originate from network devices 280*a* and/or 280*b*, for example, by subscribing to one or more defined topics.

The system controller 250*a* may support an application programming interface (API) that may include set of well-defined commands and responses (generically referred to herein as and API or as "API messages") to interact with network devices 144, 280*a* and/or 280*b*. Service-based applications (e.g., software-based applications) provided by or that execute on the network devices 144, 280*a*, and/or 280*b* may use the API to interact with the system controller. API server 264 may operate as a point of origination and termination within the system controller 250*a* for these communications. For example, a network device 144, 280*a*, and/or 280*b* may execute one or more software-based applications that provide a defined set of services to a user. These services may be based at least in part on interactions with system controller 250*a*. For example, network device 144 may provide a software-based application to a user that allows a user to control lights or shades within the user environment 202*a*. Similarly, network device 280*a* may provide a software-based application to a user that allows a user to control lights or shades from a location external to the user environment. As another example, network device 280*a* may provide an alarm based service as described above.

To provide such services, the network devices may use the API of the system controller 250*a* to communicate API messages to the system controller 250*a*. For example, network device 144 may communicate an API message to local shell client 262, which may then forward that message to the API server 264 which may then interpret and execute the message. Similarly, network device 280*a* may communicate an API message through the message broker 270 to the MQTT client 266, which may then forward that message to the API server 264 which may then interpret and execute the message. To execute/interpret an API message, the API server 264 may communicate the message (or a translated form of the message) to core 252 to provide/execute the message, the API server may communicate with database 254 to retrieve and/or store information, and/or the API server may handle the message itself. Other examples are possible.

Similarly, to provide such services, the system controller 250*a* may communicate API messages to the network devices 144, 280*a*, and/or 280*b*. For example, core 252 may communicate information that is intended for the network devices by sending that information to the API server 264. This information may include responses to or results from messages received from the network devices and executed by core 252 (e.g., messages to control the control devices 220*a*). This information may include information core 252 retrieves from database 254 in response to messages received from the network devices. Similarly, API server 264 may retrieve information directly from database 254 in response to messages received from the network devices. As API server 264 receives information from core 252 and/or database 254, for example, it may format that information according to an appropriate API message(s) and then forward the messages to local shell client 262 for forwarding to network device 144, and/or forward the messages to MQTT client 266 for forwarding to the message broker 270 and to network devices 280*a* and/or 280*b*. Other examples are possible.

With respect to information flowing out of the system controller 250*a* to the network devices 144, 280*a*, and/or 280*b*, in some instances, the information may be responsive to messages received from the network devices, as indicated above. In some cases, API server 264 may communicate such responsive messages to both local shell client 262 and MQTT client 266, regardless of where the original message originated (i.e., from a network device via local shell client 262 or a network device via MQTT client 266). In other cases, the API server may forward the response messages to only one or the other of the local shell client 262 and MQTT client 266, depending on which interface the original message originated.

According to a further aspect of system controller 250*a*, core 252 may constantly report to API server 264 status and/or event based information that originates from within the load control system 210*a*. For example, the core 252 (*i*) may report to API server 264 events detected by control-source devices from within the user environment 202*a* (e.g., occupancy/vacancy as detected by sensor 110, light levels as detected by sensors 108 and 120, detection of buttons actuated on remote control devices 113 or wall panels/switches 113, etc.), (ii) may report to API server 264 changes in the states of the electrical loads (e.g., changes to light levels, shade levels, HVAC/thermostat levels/readings, etc.) that may result from messages from control-source devices, and (iii) may report to API server 264 changes in the states of the electrical loads due to time clock events, for example. The core 252 may also report to API server 264 changes to the configuration of the load control system, such as the addition of new control devices, the changing of or creation of associations between control-source and control-target devices, etc. In general, any such information the API server 264 receives from core 252, API server 264 may forward as an API message to local shell client 262 and/or MQTT client 266 for forwarding to network device 144 and the message broker 270 and thus network devices 280*a* and/or 280*b*. In this fashion, network devices may be kept apprised of the state of the load control system 210*a* in a "real-time" fashion without having to query the load control system for its state.

Referring now more specifically to MQTT client 266, the message broker 270 (note that one message broker 270 is shown in FIG. 2; nonetheless, one will recognize that system 200 may include multiple message brokers), and the network devices 280*a* and 280*b*, each network device 280*a* and 280*b* may include a client process that supports a respective connection 232*a* and 232*b* (e.g., a TCP/IP connection, although other connections may be used) with the message broker 270, and that may support over this connection the MQTT publish-subscribe-based messaging protocol with the message broker, for example. The message broker 270 may be one or more computing devices (e.g., one or more computing servers) that function as an MQTT message broker, supporting the MQTT publish-subscribe messaging protocol, for example. The computing devices of message broker 270 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s) of message broker 270 may be configured to execute one or more software-based applications and/or firmware based modules that include instructions that when executed by the processor(s) may configure the processor(s) to perform signal coding, data processing, input/output processing, or any other function or operation that configures the message broker 270 to provide MQTT message broker functionality and operations as described herein. One will also recognize that features, functions, and processes described herein of the message broker 270 may also and/or alternatively be provided by hardware in addition to and/or as an alternative to software-based instructions and processes. The message broker 270 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. The message broker 270 may also include one or more communication interfaces/transceivers/network interface devices (not shown) communicatively coupled to the processors and/or memory devices/modules. The communication interfaces may allow the message broker 270 to communicate over one or more wired and/or wireless communication networks, such as network 282 and 283.

As the MQTT clients 266 of the respective system controllers 250*a* and 250*b* establish respective connections 230*a* and 230*b* with the message broker 270 and form respective MQTT connections over connections 230*a* and 230*b* with the message broker, for example, the message broker may start a respective process (such as a software-based process) 272*a* and 272*b*, for example, with each MQTT client 266. Similarly, as each network device 280*a* and 280*b* establishes a respective connection 232a and 232b with the message broker 270, for example, the message broker may start a respective process (such as a software-based process) 274a and 274b with each network device. In accordance with one example of the MQTT protocol, the message broker 270 may receive respective API messages from the MQTT clients 266 via connections 230a and 230b at processes 272a and 272b respectively, and forward those messages to processes 274a and/or 274b. Processes 274a and 274b may subsequently forward the API messages over connections 232a and 232b respectively to network devices 280a and 280b. Similarly, the message broker 270 may receive respective API messages from the network devices 280a and 280b via connections 232a and 232b at processes 274a and 274b respectively, and forward those API messages to processes 272a and/or 272b. Processes 272a and 272b may subsequently forward the API messages over connections 230a and 230b to MQTT clients 266 respectively of the system controllers 250a and 250b. In general, network devices 280a and 280b may proceed through an authentication process with the message broker 270 before the message broker may forward messages between the network devices and system controllers.

In accordance with an example of the MQTT protocol, as the MQTT client 266 of system controller 250a, for example, receives API messages from the API server 264, it may communicate those messages over connection 230a to the message broker 270 by publishing the API messages to a defined topic "A". Assuming network device 280a, for example, desires to receive information from the system controller 250a, it may subscribe with the message broker 270 to that same topic "A". Having subscribed to topic "A", message broker 270 may forward the API messages it receives from system controller 250a over connection 232a at process 272a to network device 280a via process 274a. Similarly, for network device 280a to communicate an API message to the system controller 250a, it may communicate those messages over connection 232a to process 274a at the message broker 270 by publishing the API messages to a defined topic "B" (one will recognize topics A and B may be same or different). To receive API messages from network device 280a, MQTT client 266 of system controller 250a may subscribe with the message broker to topic "B". Having subscribed to topic "B", message broker 270 may forward the API messages it receives from network device 280a at process 274a to the MQTT client 266 of system controller 250a over connection 230a via process 272a. Other examples are possible.

With specific reference now to topics as described above, according to one example, each system controller 250a and 250b of system 200 may have an assigned communications address, such as a MAC address (media access control address) (or possibly more than one address). This may be the address assigned to the communication interface or transceiver or network interface device of the system controller 250a and 250b that supports connection 230a and 230b respectively with the message broker, for example (A MAC address will be used herein for description purposes. Nonetheless, a different address assigned to each system controller may alternatively be used in place of a MAC address as discussed herein (such as with topics)). The MAC address of each system controller 250a and 250b of system 200 may be different/unique. In this example, system controller 250a may have the MAC address "A1:B1:C1:D1:E1:F1" and system controller 250b may have the MAC address "A2:B2:C2:D2:E2:F2" (as shown by callouts 222a and 222b). MAC addresses are further discussed below. According to a further aspect of system 200, each system controller 250a and 250b may be assigned a Unique Identifier (ID) Value (Unique ID Value), which may be a random value. In this example, system controller 250a may have the Unique ID Value of "ABC123" and system controller 250b may have the Unique ID Value of "ABC789" (as shown by callouts 222a and 222b). These are only examples. According to a still further aspect of system 200, all systems controllers 250a and 250b of system 200 may be assigned a common universal identifier. In this example, each system controller 250a and 250b has the common universal identifier of "1201" (as shown by callouts 222a and 222b). Again, these are merely examples. (One will recognize that while a system controller may be described herein as having associated with it a unique identifier, MAC address, and universal identifier, these values may also be viewed in general as being associated with a system controller's respective load control system and/or respective user environment). Topics used by system controllers 250a and 250b and network devices 280a and 280b of system 200 may have a format that uses, for example, (i) the Unique ID Value assigned to a system controller 250a/250b, (ii) the universal identifier assigned to all system controllers, and (iii) one of several different topic identifiers/values, such as "Request" and "Response", although additional and/or other values may be used. As one example, the format of the topics used by system 200 may be of the form: "/u/Universal-Identifier/d/System-Controller-ID/Topic-Identifier", where Universal-Identifier may be "1201", System-Controller-ID may be "ABC123" or "ABC789", and Topic-Identifier may be "Request" or "Response" in this example. Again, this is merely an example and other variations are possible. For example, topics used by system controllers 250a and 250b and network devices 280a and 280b of system 200 may have a format that uses, for example, (i) the MAC address assigned to a system controller 250a/250b, (ii) the universal identifier assigned to all system controllers, and (iii) one of several different topic identifiers/values, such as "Request" and "Response", although additional and/or other values may be used. As one example, the format of the topics used by system 200 may be of the form: "/u/Universal-Identifier/d/MAC-Address/Topic-Identifier", where Universal-Identifier may be "1201", MAC-Address may be "A1:B1:C1:D1:E1:F1" or "A2:B2:C2:D2:E2:F2", and Topic-Identifier may be "Request" or "Response". In one aspect, these two examples are similar in that each uses a universal identifier, a unique identifier (e.g., a MAC address of a system controller or the Unique ID Value assigned to a system controller), and a topic identifier/value. For ease of description, example systems will be described herein using topics of the form: "/u/Universal-Identifier/d/System-Controller-ID/Topic-Identifier". Again, other variations are possible and may be used.

According to one example, each time the MQTT client 266 of system controller 250a sends an API message to the message broker 270, it may publish the API message to the broker together with the topic "/u/1201/d/ABC123/Response". Similarly, each time the MQTT client 266 of system controller 250b sends an API message to the message broker 270, it may publish the API message to the broker together with the topic "/u/1201/d/ABC789/Response". If network device 280a, for example, wishes to receive API messages from system controller 250a, for example, it may subscribe with the message broker to the topic "/u/1202/d/ABC123/Response" (one will recognize that network device 280a may only need to subscribe to a portion of this topic, such as "/u/#/d/ABC123/Response", where "#" represents a wildcard value). Similarly, if network device 280*a*, for example, wishes to receive API messages from system controller 250*b*, it may subscribe with the message broker to the topic "/u/1202/d/ABC789/Response" (or simply "/u/#/d/ABC789/Response", e.g.). In this fashion, as the message broker receives API messages published by the system controllers 250*a* and 250*b*, it may examine the associated topics, determine which network devices 280*a* and 280*b* may have subscribed to the topics (at least in part), and forward the messages via processes 272*a*/272*b* and 274*a*/274*b*. As can be seen, through the use of the System-Controller-ID, a network device 280*a* and 280*b* may receive API messages from a desired system controller 250*a* and 250*b*.

According to a further example, each time network device 280*a*, for example, wishes to send an API message to system controller 250*a*, it may publish the message to the message broker 270 using the topic "/u/1202/d/ABC123/Request". Similarly, each time network device 280*a*, for example, wishes to send an API message to system controller 250*b*, it may publish the message to the message broker 270 using the topic "/u/1202/d/ABC789/Request". In other words, through the use of the System-Controller-ID, a network device 280*a* and 280*b* may communicate with a desired system controller 250*a* and 250*b*. For system controller 250*a* to receive API messages from network device 280*a*, MQTT client 266 of system controller 250*a* may subscribe to the topic "/u/1202/d/ABC123/Request" (or simply "/u/#/d/ABC123/Request", e.g.). Similarly, for system controller 250*b* to receive API messages from network device 280*a*, MQTT client 266 of system controller 250*b* may subscribe to the topic "/u/1202/d/ABC789/Request" (or simply "/u/#/d/ABC123/Request", e.g.). In this fashion, as the message broker 270 receives API messages published by the network devices 280*a* and 280*b*, it may examine the associated topics, determine which system controllers may have subscribed to the topics (at least in part), and forward the messages via processes 274*a*/74*b* and 272*a*/272*b*. Hence, through the use of the System-Controller-ID, a network device 280*a* and 280*b* may send API messages to a desired system controller 250*a* and 250*b*.

As described above, the system controllers 250*a* and 250*b* may continuously publish API messages to the message broker 270 as events occur within the respective load control systems, in addition to publishing API messages that are responsive to commands from network devices. Network devices 280*a* and 280*b* that are subscribed to receive API messages from a respective system controller (e.g., that subscribe to the "Response" based topic and the System-Controller-ID of the system controller) may in turn continuously receive the API messages. If no network device 280*a* and 280*b* is subscribed to receive messages published by a respective system controller 250*a* and 250*b*, the message broker may simply discard the message. Multiple network devices 280*a* and 280*b* may also subscribe at the same time to receive API messages from a given system controller. As can also be seen from the above, a network device 280*a* and 280*b* may communicate specific commands to and/or request information from a specific system controller 250*a* and 250*b* by publishing an API message to the message broker using a "Request" based topic and the appropriate System-Controller-ID for that system controller. Similarly, the network device may receive a response to the API message from the respective system controller by subscribing with the message broker 270 for messages having the "Response" based topic and the appropriate System-Controller-ID.

While system 200 is described herein as being based on the MQTT protocol, other message based protocols may be used, such as the Advanced Message Queuing Protocol (AMQP).

Figure 3:
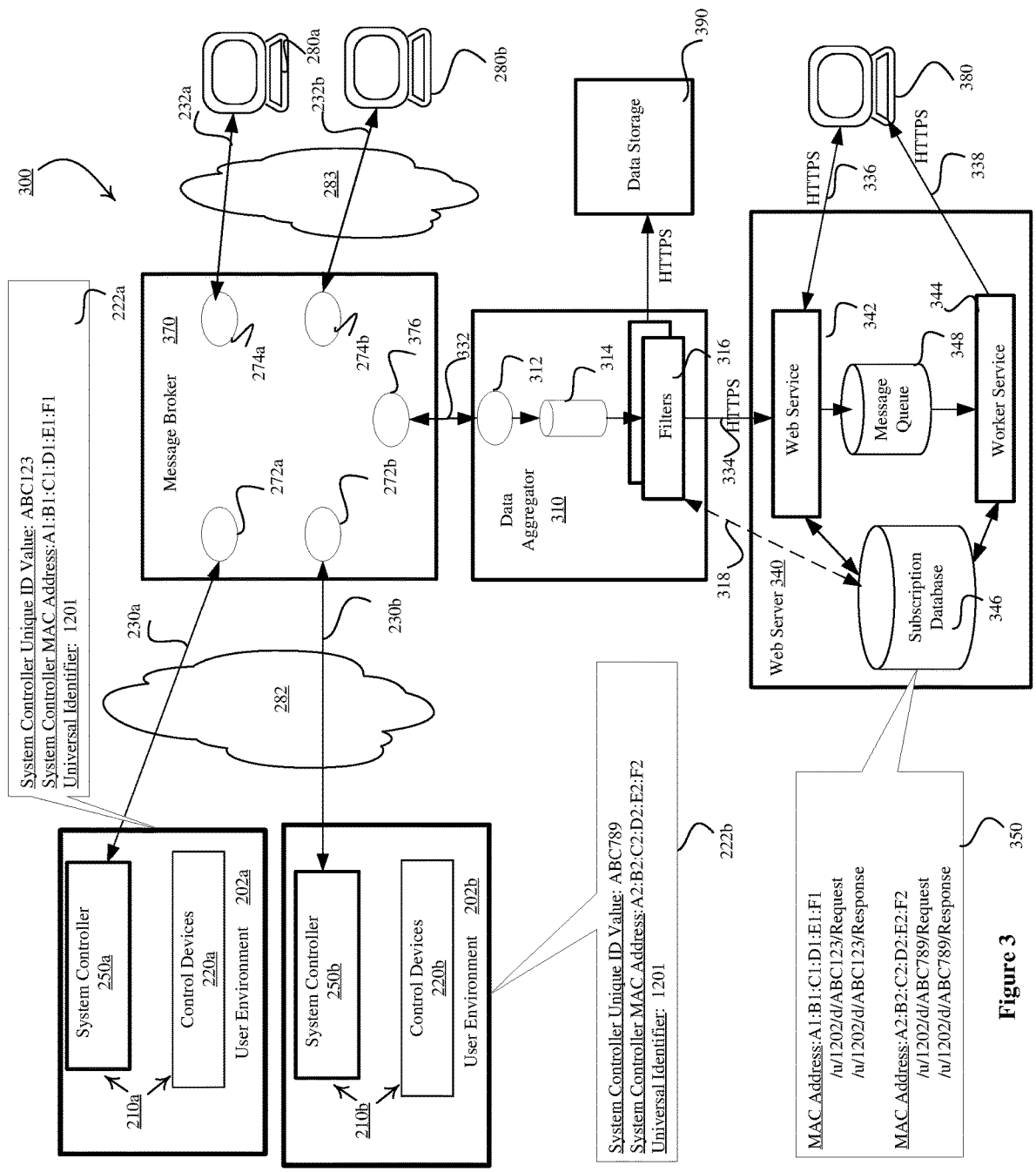
FIG. 3 is a system diagram that illustrates a system for communicating with and/or controlling a load control system using messaging based interfaces and/or HTTP based interfaces.

System 200 uses an MQTT message-based system for a network device 280*a* and 280*b* to communicate with a system controller 250*a* and/or 250*b* of a respective user environment 202*a* and 202*b*. Turning now to FIG. 3 there is shown an example system 300. While system 200 uses an MQTT message-based system for a network device 280*a* and 280*b* to communicate with a system controller 250*a* and/or 250*b*, system 300 allows a network device 380, for example, to communicate with a system controller 250*a* and/or 250*b* using an HTTP (Hypertext Transfer Protocol) based interface. Network device 380 may be similar to network devices 280*a* and 280*b* in that it may be a device in use by a user (e.g., a home-owner of a user environment) and/or may be a third-party integrator configured to provide a service(s) based on interactions with respective system controllers 250*a* and/or 250*b* through the API supported by these controllers. In particular, system 300 may allow a network device 380 to receive API messages published by respective system controllers 250*a* and 250*b* using an HTTP interface. The information of these API messages may include for example, event and status based information occurring in a respective load control system 210*a* and 210*b* and that is continuously published by the system controllers 250*a* and 250*b* to the message broker 370 (it may also include API messages that are responsive to messages from network devices). Example system 400 of FIG. 4, which is discussed below, shows an example system that further allows network device 380 to communicate API messages to (and receive responses from) respective system controllers 250*a* and 250*b* using an HTTP interface. While FIG. 3 shows only one network device 380, there may be numerous such devices in system 300.

System 300 may include one or more message brokers 370 (one shown here) that may operate similar to message broker 270 as described for system 200. System 300 may also include one or more user environments 202*a* and 202*b* and respective system controllers 250*a* and 250*b* (and associated control devices 220*a* and 220*b*) that may have MQTT interfaces with message broker 370, and may also include one or more network devices 280*a* and 280*b* that may communicate through MQTT interfaces with message broker 370. System controllers 250*a* and 250*b*, message broker 370, and network devices 280*a* and 280*b* may similarly operate as described for system 200. System 300 may now also include one or more data aggregators 310 (one shown here), one or more web servers 340 (one shown here), and one or more network devices 380 that may communicate with web server 340 (where the or more network devices are represented as network device 380 in FIG. 3).

Again, while system 300 is described herein as being based on the MQTT protocol, other message based protocols may be used, such as the Advanced Message Queuing Protocol (AMQP).

The data aggregator 310 may be one or more computing devices (e.g., one or more computing servers) that may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s)

of data aggregator 310 may be configured to execute one or more software-based applications and/or firmware based modules that include instructions that when executed by the processor(s) may configure the processor(s) to perform signal coding, data processing, input/output processing, or any other function that configures the data aggregator to operate as described herein. One will also recognize that features, functions, and processes of data aggregator 310 described herein may also and/or alternatively be provided by hardware in addition to and/or as an alternative to software-based instructions and processes. Data aggregator 310 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. Data aggregator 310 may also include one or more communication interfaces/transceivers/network interface devices (not shown) communicatively coupled to the processors and/or memory devices/modules. The communication interfaces may allow data aggregator 310 to communicate over one or more wired and/or wireless communication networks (not shown) with the message broker 370 and the web server 340. The data aggregator 310 may also include one or more user interfaces such a display monitor, keyboard, mouse, speakers, audio receivers, etc.

The data aggregator 310 may include an MQTT client module 312 (also referred to herein as MQTT client), a pipe module 314 (also referred to herein as pipe), and a filters module 316 (also referred to herein as filters) (One will recognize that the names data aggregator, MQTT client, and pipe as used herein are for description purposes only). Each of these modules may be configured to operate as one or more software based processes within the data aggregator, although other configurations may be used. While data aggregator 310 is shown as having example modules 312, 314, and 316 the aggregator may include fewer, other, and/or additional modules. Starting with MQTT client 312, it may be configured to support a communications connection 332 with the message broker 370. This connection may be, for example, a TCP/IP based connection, although other connections may be used. On top of this connection the MQTT client 312 may support the MQTT publish-subscribe-based messaging protocol with the message broker 370, with the MQTT client 312 acting as a client to the message broker. As the MQTT client 312 of the data aggregator 310 establishes connection 332 with the message broker and forms an MQTT connection to the broker for example, the message broker may start a respective process 376 with the MQTT client 312. According to one example, MQTT client 312 may subscribe with the message broker 370 to the topic "/u/1202/d/#/Response" (where "#" represents a wildcard value). By subscribing to a topic that uses the Universal-Identifier (here "1201") common to all system controllers 250a and 250b, the message broker 370 may forward from respective processes 272a/272b to process 376 all API messages published by the system controllers 250a and 250b to the message broker 370 that use the "Response" based topic. In turn, process 376 may forward the API messages to MQTT client 312 via connection 332. One will recognize that other topics may also be used. For example, MQTT client 312 may also subscribe with the message broker 370 to the topic "/u/1202/d/#/Request" (or alternatively, to the topic "/u/1202/d/#/#"). Here, the message broker 370 may also forward from respective processes 274a/274b to process 376 (and thus the MQTT client 312) all API messages published by the network devices 280a and 280b to the message broker 370 that use the "Request" based topic. Again, these are merely examples and other mechanisms may be used for the message broker 370 to forward API messages to the data aggregator 310. For example, the data aggregator may subscribe to receive API messages from a specific set of system controllers, for example, by specifying the full topic used by the respective controllers (e.g., "/u/1202/d/ABC123/Response" and "/u/1202/d/ABC789/Response"). Assuming the data aggregator only subscribes to "Response" based topics from all system controllers 250a and 250b, as the message broker passes API messages to process 376, the process may in turn communicate the API messages to the MQTT client 312 via connection 332. Process 376 may also communicate, with the API messages, the full topic to which an API message was published by the respective system controller 250a and 250b (i.e., the topic may include the System-Controller-ID of the respective system controller, such as "/u/1202/d/ABC123/Request" or "/u/1202/d/ABC789/Request"). As the MQTT client 312 receives API messages (and the associated topics) from the message broker 370, it may forward the API messages/topics to pipe module 314.

Pipe module 314 may be configured to function as a data cache/message queue, for example, that receives API messages and possibly topics from MQTT client 312, that processes the API messages (e.g. aggregates several API messages into larger blocks for data efficiency), that places/writes the API messages in a message queue, and that controls the reading of the API messages from the message queue by filters 316 for further processing. According to another example, pipe module 314 may be multiple message queue, with MQTT client 312 putting API messages into respective ones of the queues. In this way, pipe module 314 may act as temporary storage until API messages are processed by filters 316, as described below. According to another aspect, depending on the number of user environments 202a and 202b/load control systems 210a and 210b in system 300, there may be multiple message brokers 370, with different message brokers servicing different system controllers 250a and 250b. Here, data aggregator 310 may have multiple MQTT clients 312, each to a respective message broker. According to this example, pipe module 314 may receive API messages from each MQTT client 312 and aggregate these messages into one message queue or multiple message queues (e.g., one message queue for each MQTT client) for processing by the filters 316.

Filters 316 may represent one or more modules (which may operate as one or more software-based processes for example) that read and/or receive API messages (and associated topics) from pipe module 314, that filter those API messages based on one or more criteria, and that then forwards resulting information to one or more destinations. In one aspect, there may be multiple filter modules executing at any given time, each analyzing the same API messages read/received from pipe module 314, and each searching for and analyzing specific data and routing resulting information to a respective destination. According to another aspect, assuming pipe module 314 is multiple message queues, each queue may have respective filter(s). The filters 316 may be dynamic in that an administrator may change the filters depending on a desired configuration of system 300. The filters 316 may filter based on specific fields of the API messages themselves and/or on the topics associated with respective API messages. Different filters may be configured to have different functions. For example, one filter may operate to simply remove/discard certain types of API messages (e.g., there may be certain status information produced by the system controllers 250a and 250b that are not needed by network device 380) and route the remaining API messages (and associated topics) to a certain destination. Another filter may be configured to operate to search for and detect certain API messages and/or topics and route those API messages (and associated topics) to a certain destination. Another filter 316 may be configured to perform operations on API messages read/received from pipe module 314 (such as performing statistical analysis on the API messages) and forward the results to a specific destination. One will recognize that other examples are possible.

According to example system 300, filters 316 may have a communications connection 334 with web server 340. This connection may be, for example, a TCP/IP or UDP/IP based connection, although other types of connections may be used. Web server 340 may support an HTTP/HTTPS (Hypertext Transfer Protocol/secure Hypertext Transfer Protocol) interface on this connection with standard methods (such as GET, PUT, POST, DELETE, etc.), although one will recognize that other interfaces may be used. As filters 316 receives API messages from pipe module 314, it may discard certain messages based on one or more fields of the messages and communicate the remaining API messages (together with their respective topics as published by the system controllers 250a and 250b, for example) to the web server 340 over connection 334. Filters 316 may do this by using standard HTTP methods, such as PUT commands, although other commands may be used. Again, data aggregator 310 may include other filters that route API messages/information to other destinations. As an example, system 300 also may also include a data storage system 390 that may receive information from filters 316 and store this information in a database. Database 390 may be flat database, relational/SQL database, NoSQL/non SQL database, and/or a time series database, etc., although any form of database(s) may be used. One will appreciate that filters 316 may communicate API messages to the web server 340 one at a time, or in batches on a periodic basis (such as every X seconds or minutes, every Y messages, and/or when Z bytes of messages are ready to be forwarded, etc.). Other variations are possible.

As noted above, pipe module 314 may be multiple message queues, each having respective filters 316. Here, each filter 316 may have a respective connection 334 with web server 340 and may be similarly configured to discard certain API messages received from its respective message queue and to communicate the remaining API messages to the web server 340 over its respective connection.

According to one specific example, one or more operations/functions of data aggregator 310 may be provided by Amazon Web Services, where API messages from the message broker 370 may fed to a Kinesis Stream consisting of one or more shards, and where Lambda function(s) may obtain the API messages from the Kinesis Stream, filter the API messages to discard certain messages, and forward the remaining API messages (and associated topics) over HTTP interface(s) 334 to the web server 340. Other examples are possible.

Turning now to web server 340, it may be one or more computing devices (e.g., one or more computing servers) that may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s) of web server 340 may be configured to execute one or more software-based applications and/or firmware based modules that include instructions that when executed by the processor(s) may configure the processor(s) to perform signal coding, data processing, input/output processing, or any other function that configures the web server 270 to function/operate as described herein. One will also recognize that features, functions, and processes described herein of the web server 270 may also and/or alternatively be provided by hardware in addition to and/or as an alternative to software-based instructions and processes. Web server 340 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. Web server 340 may also include one or more communication interfaces/transceivers/network interface devices (not shown) communicatively coupled to the processors and/or memory devices/modules. The communication interfaces may allow web server 340 to communicate over one or more wired and/or wireless communication networks (not shown). Over these networks, web server 340 may support one or more connections 334 with the data aggregator 310, and may support respective connections 336 and 338 with respective network devices 380. The web server 340 may support HTTP/HTTPS based interfaces with standard methods on these connections, for example, to communicate with the data aggregator 310 and network devices 380. In one aspect, web server 340 may function as an HTTP publish-subscribe server.

Web server 340 may include a web service module 342 (also referred to herein as web service) and a worker service module 344 (also referred to herein as worker service) (One will recognize that the names web server, web service, and worker service as used herein are for description purposes only). Each of these modules may operate as one or more software based processes within the web server. A message queue 348, for example, may connect the web service module 342 and the worker service module 344. This message queues may be implemented as a Redis cache, although other implementations may be used. Web server 310 may also include one or more databases such as subscription database 346. Subscription database 346 may be flat database, relational/SQL database, NoSQL/non SQL database, and/or a time series database, etc., although any form of database(s) may be used. While web server 340 is shown as having example modules 342 and 344, message queue 348, and database 346, the server may have other configurations.

Beginning with subscription database 346, it may include at least one entry for each system controller 250a and 250b of system 300. As further described below, web service 342 may treat/use the MAC addresses of the system controllers 250a and 250b as topics or channels (as that term may be used for an HTTP publish-subscribe server) that network devices 380 may subscribe to, although this is one example and other examples are possible. Assuming this format is used, the subscription database 346 may include the MAC address for each system controller 250*a* and 250*b* and may further include and associate/relate with each MAC address the respective topics that the system controller publishes and/or subscribes to with the message broker 370. For example and a shown by callout 350, for system controller 250*a* the subscription database 346 may include the MAC address of the system controller ("A1:B1:C1:D1:E1:F1"), and may associate with this address one or more of the topics used by the system controller 250*a* (here, "/u/1202/d/ABC123/Request" and "/u/1202/d/ABC123/Response"). Similarly, for system controller 250*b* the subscription database 346 may include the MAC address of the system controller ("A2:B2:C2:D2:E2:F2"), and may associate with this address one or more of the topics used by the system controller 250*b* ("/u/1202/d/ABC789/Request" and "/u/1202/d/ABC789/Response"). A system administrator may configure and maintain this database. Hence, as new user environments 202 with respective system controllers 250 are added to system 300, the subscription database 346 may be updated to include the MAC address and associated topics of the new system controller. Again, this is one example and other examples are possible. As another variation, web service 342 may treat/use the System-Controller-IDs of the system controllers 250*a* and 250*b* as topics or channels that network devices 380 may subscribe to. Assuming this format is used, the subscription database 346 may include the System-Controller-ID for each system controller 250*a* and 250*b* and may further include and associate/relate with each System-Controller-ID one or more of the respective topics that the system controller publishes and/or subscribes to with the message broker 370. For example, the subscription database 346 may be configured as follows:

System-Controller-ID: ABC123
        Topic:/u/1202/d/ABC123/Request
        Topic:/u/1202/d/ABC123/Response
    System-Controller-ID: ABC789
        Topic:/u/1202/d/ABC789/Request
        Topic:/u/1202/d/ABC789/Response Again, this is one example and the web service 342 may associate any value/identifier with respective system controllers 250*a* and 250*b* and use that value/identifier as a topic or channel, and associate that value/identifier with one or more of the topics used by the system controllers. For purposes of description, web service 342 will be described herein as using the MAC addresses of the system controllers 250*a* and 250*b* as topics/channels.

Turning to web service 342, as indicated it may treat each of the MAC addresses listed in the subscription database 346 as a topic or channel that a network device 380 may subscribe to via interface 336. Web server 340 may be configured to operate as follows. A network device 380 may desire to receive API messages published by system controller 250*a*, for example, to the message broker 370. To do this, network device 380 may communicate with web service 342 via connection 336 to subscribe to the MAC address of system controller 250*a* (i.e., subscribe to MAC address "A1:B1:C1:D1:E1:F1"). In subscribing to the MAC address with the web service 342, network device 380 may also provide the web service with a notification address (e.g., a uniform resource locator (URL)) to which the web server 340 may post any API messages. The web service may store this notification address in subscription database 346 together with an indication that the network device 380 has subscribed to the MAC address of the system controller 250*a*. In a similar fashion, the network device 380 may also communicate with web service 342 via connection 336 to unsubscribe to a MAC address of a system controller, such as system controller 250*a*. In turn, the web service may update the subscription database 346 to indicate that the network device 380 has unsubscribed to the MAC address of the system controller 250*a*. Web service 342 may store which network devices 380 have subscribed to which channels in other manners.

According to one example, web service 342 may receive over connection(s) 334 from the data aggregator 310 the API messages published by all system controllers 250*a* and 250*b* as described above (or a subset thereof if the filters 316 have removed certain API messages such as certain status messages). Again, these API messages may have topics associated with them of the form "/u/1202/d/ABC123/Response" and "/u/1202/d/ABC789/Response", as an example. As the API messages are received, the web service 342 may translate the topics to MAC addresses using the configuration information of the subscription database 346. For example, the web service 342 may translate the topic "/u/1202/d/ABC123/Response" of API messages from system controller 250*a* to the MAC address "A1:B1:C1:D1:E1:F1" of system controller 250*a*. The web service 342 may then determine whether any network device 380 has subscribed to this MAC address. If a network device 380 has subscribed to the MAC address, the web service 342 may write, for example, the API message together with its associated topic and/or MAC address to the message queue 348. On the contrary, if no network device 380 has subscribed to the API message, the web service 342 may discard the API message. As an alternative to translating topics of API messages received from the data aggregator 310 to MAC addresses as just described, as a network device 380 subscribes to a MAC address the web service 342 may use the subscription database 346 to translate the MAC address to a topic or a portion thereof (e.g., translate the MAC address "A1:B1:C1:D1:E1:F1" of system controller 250*a* to the topic "/u/1202/d/ABC123/Response"). As the web service receives from the data aggregator 310 the API messages published by the system controllers 250*a* and 250*b*, it may compare the topics associated with the messages to "topics" subscribed to by network devices 380. If a network device 380 has subscribed to the topic, the web service 342 may write the API message together with its associated topic and/or MAC address to the message queue 348. On the contrary, if no network device 380 has subscribed to the API message, the web service 342 may discard the API message. Other variations are possible. In general, through a MAC address as specified by a network device and through the System-Controller-ID portion of the topics associated with API messages, the web service, at least in part, may correlate/associate received API messages to the messages the network devices are looking to receive.

As described above, web service 342 may receive from the data aggregator 310 the API messages published by the system controllers 250*a* and 250*b* (or a subset thereof if the filters 316 have removed certain API messages), and may then determine or analyze each API message to determine whether any network device 380 has a subscription to receive the respective API message. As another variation, as filters 316 receives API messages from the pipe module 314, it may discard certain messages (such as certain status messages), and then periodically batch the remaining messages into blocks. How it batches messages into blocks may vary. Some examples may include (i) batching messages on a time basis (e.g., batch messages over X min periods), (ii) batching messages on a number of API messages (e.g., create blocks of X API messages), (iii) batching messages on a size basis (e.g., create blocks of X bytes or less), or some combination thereof. With respect to each batch of API messages, filters 316 may determine the topics associated with the messages, and communicate a list of these topics to the web service 342 over connection 334. For example, filters 316 may provide the full topics (e.g., "/u/1202/d/ABC123/Response" and "/u/1202/d/ABC789/Response") or a just a portion of the topics (e.g., just the System-Controller-IDs). As an alternative, filters 316 may have access to subscription database 346 (as shown by connection 318) and translate topics to MAC addresses and pass MAC addresses to the web service 342. Other examples are possible. Regardless, filters 316 may not forward the actual API messages at this time. Upon receiving the list of topics, web service 342 may determine for each topic whether a network device 380 is presently subscribed to the topic (e.g., by correlating topics with MAC addresses that have been subscribed to) and communicate back to filters 316 over connection 334 an indication of those topics that are subscribed to (or alternatively, not subscribed to). Upon receiving this communication from the web service 342, filters 316 may discard from the batched API messages those that are not subscribed to and forward the remaining API messages to the web service 316 over connection 334. Upon receiving the API messages, the web service 342 may write each API message together with its associated topic and/or MAC address to the message queue 348. Filters 316 and the web service 342 may then repeat the process, with filters 316 batching another set of API messages and communicating with web service to determine which associated topics are currently subscribed to. Other variations are possible. One advantage of this configuration is that less data needs to be communicated from the data aggregator 310 to the web server 340, providing more efficient communications.

According to a still further variation, each time a network device 380 subscribes with the web service 342 to a MAC address of a system controller 250 for example, web service 342 may translate that MAC address to a topic (e.g., for system controller 250*a*, it may translate the MAC address "A1:B1:C1:D1:E1:F1" to the topic "/u/1202/d/ABC123/Response"). Web service 342 may then communicate the topic to the filters 316 over connection 334, instructing filters 316 to forward any API message having the corresponding topic. As an alternative, assuming filters 316 have access to subscription database 346 for example, web service 342 may pass MAC addresses to filters 316, which may then translate the MAC addresses to topics. Other examples are possible. One will appreciate that if multiple network devices 380 subscribe to API messages from the same system controller, web service 342 may only communicate once with filters 316. Regardless, as filters 316 receives API messages from pipe module 314, it may discard certain messages (such as certain status messages), and then compare the topics of the API message to the topics provided to it by the web service 342 to determine whether a network device 380 has subscribed to receive the message. If a network device 380 has subscribed to the topic, the filters 316 may forward the API message (and it associated topic) to the web service 342 over connection 334. Web service 342 may then write the API message together with its associated topic and/or MAC address to the message queue 348. On the contrary, if no network device 380 has subscribed to the API message, the filters 316 may discard the API message. Similarly, each time a network device 380 unsubscribes with the web service 342 to a MAC address of a system controller 250, web service 342 may translate that MAC address to a topic and then communicate the topic to the filters 316 over connection 334, instructing filters 316 to stop forwarding related API messages. One will appreciate that if multiple network devices are subscribed to the same MAC address at the same time, web service 342 may not communicate this instruction to the filters 316 if other devices are still subscribed. Again, this is merely an example and other variations are possible.

Turning to worker service 344, it may read API messages from the message queue 348, determine the notification address of each network device 380 that subscribed to receive the API message, and use the notification address to communicate the API message to the respective network device over a respective connection 338 (one will recognize that the notification address may be different from the network device). The worker service 344 may determine notification addresses using the subscription database 346 as indicated above although other mechanisms may be used to determine the addresses. In communicating the API message to a network device, the worker service 344 may include the topic associated with the API message and/or the MAC address of the respective system controller. Thereafter, the network device 380 may receive and operate on the API message, for example.

While the web service 342 and worker service 344 are shown and described as communicating via message queue 348, this queue may not be required and the two modules may communicate in other fashions. In one aspect, however, message queue 348 may provide one mechanism of temporarily storing API messages in high data demand situations. Also, the use of MAC addresses, for example, rather than the noted "Request" and "Response" topics as a mechanism for network devices 380 to subscribe to API messages is not necessarily required and web service 342 and network devices 380 may be configured to subscribe to the noted topics directly (i.e., a network device 380 may subscribe to "/u/1202/d/ABC123/Response"). Nonetheless, the noted configuration of using MAC addresses or a variation thereof, for example, has at least one benefit in that the system controllers 250 and subscription database 346 may be updated at future times to use different topics. The network devices using MAC addresses (which may be static values), for example, that are correlated to the noted topics may allow topics to change without affecting service applications provided by network devices.

Again, a given network device 380 may subscribe to receive from web server 340 API messages produced by numerous system controllers. Similarly, numerous different network devices may subscribe to receive from web server 340 API messages produced by the same system controller.

Figure 4:
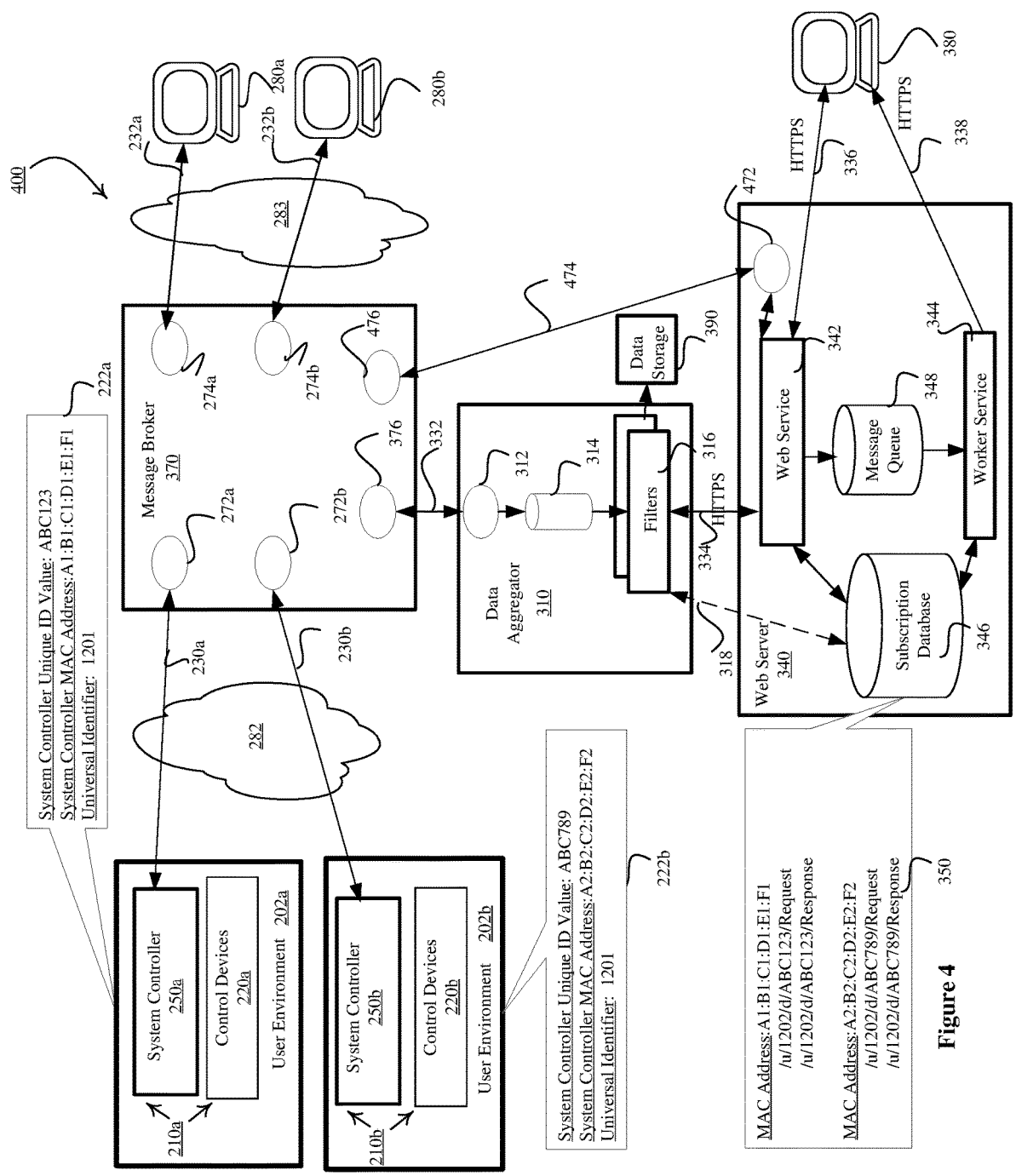
FIG. 4 is a system diagram that illustrates another system for communicating with and/or controlling a load control system using messaging based interfaces and/or HTTP based interfaces.

Turing now to FIG. 4, there is shown an example system 400. System 400 may be similar to system 300 but in addition to receiving API messages from system controllers 250*a* and 250*b*, network devices 380 may also communicate API messages to designated system controllers 250*a* and 250*b* (such as to control light levels in a respective user environments) using an HTTP interface, for example.

According to system 400, web server 340 may now also include an MQTT client module 472 that may support a communications connection 474 with the message broker 370. This connection may be, for example, a TCP/IP based connection, although other connections may be used. On top of this connection the MQTT client 472 may support the MQTT publish-subscribe-based messaging protocol with the message broker 370, with the MQTT client 472 acting as a client to the message broker, for example. As the MQTT client 472 of the web server 340 establishes connection 474 with the message broker and forms an MQTT connection to the broker, the message broker may start a respective process 476 with the MQTT client 472, for example.

To communicate an API message to a specific system controller 250, such as system controller 250a, a network device 380 may publish the API message over connection 336 to the web service 342 and in particular, may publish the message to the MAC address of system controller 250a (i.e., "A1:B1:C1:D1:E1:F1"). Noting that the network device has published the API message to the MAC address, web service 342 may use subscription database 346 to translate the MAC address to the "Request" topic associated with the MAC address (here, "/u/1202/d/ABC123/Request"). Thereafter, the web service may forward the API message and the "/u/1202/d/ABC123/Request" topic, for example, to the MQTT client 472. MQTT client 472 may in turn publish the API message over connection 474 to the message broker 370 using the topic "/u/1201/d/ABC123/Request". At the same time, MQTT client 472 may also subscribe over connection 474 with the message broker 370 to the "Response" topic associated with the MAC address of controller 250a (i.e., "/u/1202/d/ABC123/Response"), which may also be forwarded by the web service 342 to MQTT client 472, for example. By subscribing to the "Response" topic of system controller 250a, MQTT client 472 may receive from the system controller 250a any response to the API message.

Accordingly, as process 476 receives the API message from MQTT client 472, the message broker 370 may forward the API message to process 272a for forwarding to the system controller 250a (the controller 250a having subscribed to the topic "/u/1202/d/ABC123/Request" as discussed above). As the system controller 250a processes the API message, it may generate a response API message, which it may publish to the message broker 370 using topic "/u/1202/d/ABC123/Response", as described for system 200 and 300, for example. Because the MQTT client 472 subscribes to the topic "/u/1202/d/ABC123/Response", the message broker 370 may forward this response API message from process 272a to process 476, which may then forward the response API message to MQTT client 472 over connection 474. Upon receiving, for example, the response API message, MQTT client 472 may unsubscribe to the topic "/u/1202/d/ABC123/Response", and may forward the response API message to the web service 342. Web service 342 may thereafter translate the topic of the response API message from "/u/1202/d/ABC123/Response" back to the MAC address of the system controller 250a, and communicate the response API message to the network device 380 over connection 336. Again, other variations are possible, such as the network device 380 subscribing to the System-Controller-IDs rather than MAC addresses, for example.

According to a further aspect of system 400, web server 340 may have a plurality (two or more) of MQTT clients 472 with respective connections 474 to the message broker 370. The web service 342 may use respective ones of the MQTT clients 472, one at a time, to communicate API messages from network devices 380 to respective system controllers 250 and to receive responses thereto.

While system 400 is described herein as being based on the MQTT protocol, other message based protocols may be used, such as the Advanced Message Queuing Protocol (AMQP).

While system 300 and system 400 are described herein as including data aggregator 310, another variation of these systems may not include this module. Here, the message broker 370 may directly communicate API messages to the web server 340. Data aggregator 310 may not be needed, for example, if the message broker 370 is receiving a limited amount of information from the load control systems 210a and 210b, and/or if there is a limited number of load control systems providing information to the message broker. Similarly, variations of system 300 and system 400 may include data aggregator 310, but may not necessarily include filters 316 that are configured to remove API messages from the stream of API messages from pipe module 314. In other words, data aggregator 310 may forward all API messages to the web server 340 that it receives from the message broker rather than removing some messages. Nonetheless, one will recognize that the data aggregator and its respective filters module may provide one example mechanism for controlling the rate at which information flows into the web server 340 and the amount of data that flows into and needs to be communicated to the web server. In addition, while the system controllers 250a and 250b have been described herein as generally forwarding, in a non-selective fashion, large amounts of information/API messages to the message broker with the data aggregator then filtering this information, the system controllers may be configured to selectively forward only certain API messages to the message broker. However, this may not be desirable in that if it is later realized that other information may be needed/wanted from the system controllers, it may be difficult to access all of these systems and make the modification. The system controllers non-selectively forwarding large amounts of information/API messages to the message broker and the filters module 316 being configured to selectively discard certain API messages has one advantage in that if it is later realized that it may be desirable to have the filters 316 forward additional information or discard other information, an administrator may simply update the filters.

Figure 5:
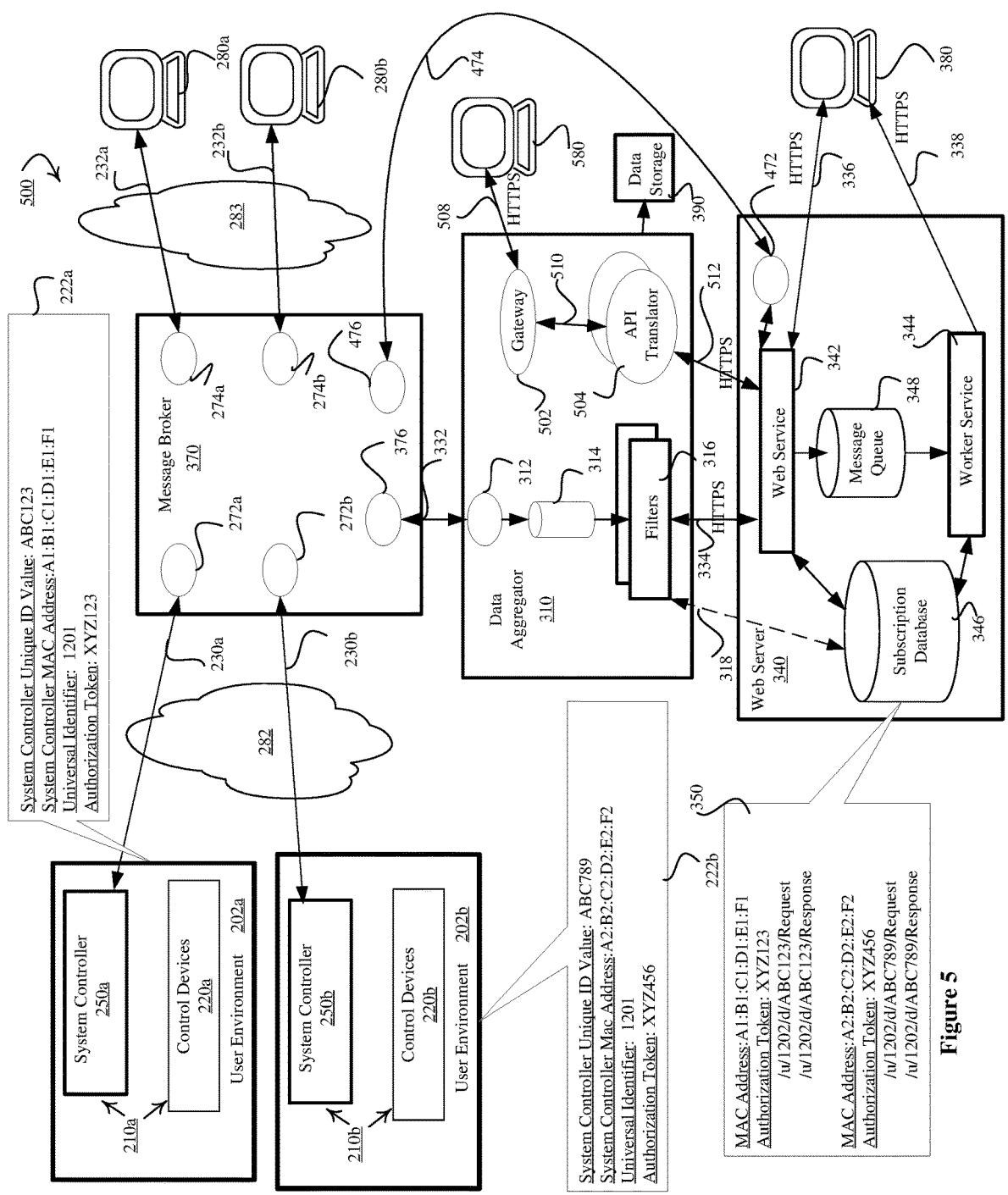
FIG. 5 is a system diagram that illustrates a further system for communicating with and/or controlling a load control system using messaging based interfaces and/or HTTP based interfaces.

Turning now to FIG. 5, there is shown an example system 500. System 500 is similar to system 400, for example, but may now also allow a network device 580 to communicate messages with (i.e., send messages to and receive messages from) designated system controllers 250a and 250b using an API that is different from the API supported by the system controllers. In other words, as discussed with respect to system 400, a network device 380 may communicate with system 400 using the API supported by the system controllers 250a and 250b. According to system 500, network device 580 may communicate over an HTTP interface with system 500 but now use a third-party API that may be specific to the network device, with system 500 translating between the API supported by the system controllers and the third-party API. For description purposes only, messages formatted according to the API supported by the system controllers 250a and 250b will be referred to herein as "API messages", and messages formatted according to the third-party API supported by the network controller 580 will be referred to herein as "third-party API messages".

Network device 580 may be similar to network devices 280a and 280b and network device 380 in that it may be a device in use by a user (e.g., a home-owner of a user environment) and/or may be a third-party integrator configured to provide a service(s) based on interactions with respective system controllers 250a and 250b. While FIG. 5 shows only one network device 580, there may be numerous such devices each configured to communicate with one or more system controllers, possibly at the same time.

As compared to system 400, data aggregator 310 of system 500 may now include a gateway module 502 (also referred to herein as gateway) and an API translator module 504 (also referred to herein as API translator) (One will recognize that the names gateway and API translator as used herein are for description purposes only). While gateway module 502 and API translator module 504 are shown as being part of data aggregator 310, these modules may alternatively be provided by one or more other computing devices such as by web server 340 or message broker 370, for example, or by another computing device(s) separate from any of message broker 370, data aggregator 310, or web server 340. Each of gateway module 502 and API translator module 504 may operate as one or more software based processes within the data aggregator, although other implementations are possible Beginning with gateway 502, it may be configured to support respective network communication connections 508 with network device 580 for each system controller 250a and 250b the network device is communicating with. Gateway 502 may support an HTTP/HTTPS based interface on connection 508 that may be used by network device 580 to communicate with gateway 502. As indicated, services provided by network device 580 may be based on a third-party API. As such, network device 580 may communicate to gateway 502 a third-party API message for a particular system controller 250a and 250b. Gateway 502 may be configured to then forward that third-party API message to the system controller as further described below. Similarly, if the system controller responds with an API message, that response message may be forwarded to the gateway 502, which may then forward the response message to the network device as a third-party API message. Similarly, network device 580 may communicate with gateway 502 to subscribe to receive API messages published by a particular system controller 250a and 250b. Gateway 502 may be configured to forward this subscription request to the web server 340. As the web server receives API messages from a subscribed to system controller, the web server may forward these messages to the gateway 502, which may then forward the message to the network device as third-party API messages. According to one example, gateway 502 may be agnostic to the specific third-party API used by network device 580, but may be configured such that the format of the third-party API used by the network device needs to be based on a standard. As one example, gateway 502 may be configured such that the third-party API may need to be a RESTful (representational state transfer) based API where, for example, network device 580 communicates with gateway 502 using standard methods (such as, for example, GET, PUT, POST, DELETE, etc.) and where, for example, system controllers 250a and 250b and control devices 220a and 220b, for example, are treated as resources. Again, this is one example and others are possible.

Turning to API translator 504, it may provide API translation services for system 500. In particular, API translator 504 may have a connection 510 with gateway 502. As gateway 502 receives a third-party API message from network device 580 that is destined for a particular system controller 250a or 250b, the gateway may forward that message to API translator 504. API translator 504 may be configured to then translate the third-party API message to an API message (i.e., API message supported by the system controllers) and forward the API message to the system controller. Similarly, assuming the system controller responds with an API message, that message may be forwarded to the API translator 504. The API translator 504 may be configured to then translate the API message to a third-party API message and forward the third-party API message to the gateway 502, which may then forward the message to the network device 580. Similarly, as gateway 502 receives from network device 580 a subscription request to receive API messages published by a particular system controller, such as system controller 250a, the gateway may forward that request to the web server, possibly through the API translator 504 for translation, if necessary. Assuming the web server receives at connection 334 API message(s) published by system controller 250a, the web server may forward those API message(s) to the API translator 504. The API translator 504 may be configured to then translate the API message(s) to third-party API message(s) and forward the third-party API message(s) to the gateway 502, which may then forward the message(s) to the network device 580.

According to one example, system 500 may include multiple API translators 504, each configured to translate messages between the API used by the system controllers and the third-party API used by the network device, and each having a respective connection 510 with gateway 502. As network device 580 desires to communicate with and/or receive messages from a particular system controller 250a or 250b, gateway 504 may use an "available" API translator 504 for that communication. In other words, a given API translator 504 may only support communications with a one system controller 250a and 250b at any given time. Accordingly, to one example, API translators 504 may statically exist (i.e., there is a defined number "running" or executing at any given time) and available/free translators may be used by gateway 502 as needed. According to another example, API translators may be created as needed by the gateway 502. According to this example, gateway 502 and API translator(s) 504 may be specific to a particular third-party API. As discussed below, additional instances of gateway 502 and API translator(s) 504 may be used to support additional third-party APIs.

Assuming system 500 includes multiple API translators 504, as further shown in FIG. 5 each API translator may have a respective communications connection 512 with web server 340 and in particular, with web service 342. This connection may be, for example, a TCP/IP or UDP/IP based connection, although other connections may be used. Web server 340/web service 342 may support an HTTP/HTTPS based interface on this connection with standard methods as discussed herein.

Reference will now be made to an example operation of system 500. To communicate a particular command or request, for example, to a specific system controller 250, such as system controller 250a, network device 580 may communicate a third-party API message to the gateway 502 via communications connection 508. The network device may communicate the message using a standard POST command, for example. With this third-party API message the network device may include the MAC address of system controller 250a (i.e., "A1:B1:C1:D1:E1:F1") (although the System Controller Unique ID Value may also be used, for example). Upon receiving the message, the gateway 502 may forward the third-party API message (and MAC address) to a respective API translator 504 via a respective connection 510. Upon receiving the message, the API translator 504 may translate the third-party API message to an API message. Thereafter, the operation flow may proceed as similarly discussed with respect to FIG. 4, for example. The API translator 504 may next publish the API message over a respective connection 512 to the web service 342 and in particular, may publish the message to the MAC address of system controller 250a (i.e., "A1:B1:C1:D1:E1:F1"). Noting that the API translator has published the API message to the MAC address, web service 342 may use subscription database 346 to translate the MAC address to the "Request" topic associated with the MAC address (here, "/u/1202/d/ABC123/Request"). Thereafter, the web service may forward the API message and the "/u/1202/d/ABC123/Request" topic to the MQTT client 472. MQTT client 472 may in turn publish the API message over connection 474 to the message broker 370 using the topic "/u/1201/d/ABC123/Request". At the same time, MQTT client 472 may also subscribe over connection 474 with the message broker 370 to the "Response" topic associated with the MAC address of controller 250a (i.e., "/u/1202/d/ABC123/Response"). By subscribing to the "Response" topic of system controller 250a, MQTT client 472 may receive from the system controller 250a any response to the API message.

Accordingly, as process 476 of the message broker 370 receives the API message from MQTT client 472, the message broker may forward the API message to process 272a for forwarding to the system controller 250a (the controller 250a having subscribed to the topic "/u/1202/d/ABC123/Request" as discussed above). As the system controller 250a processes the API message, it may generate a response API message, which it may publish to the message broker 370 using topic "/u/1202/d/ABC123/Response", as described for system 200, 300, and 400 for example. Because the MQTT client 472 subscribes to the topic "/u/1202/d/ABC123/Response", the message broker 370 may forward this response API message from process 272a to process 476, which may then forward the response API message to MQTT client 472 over connection 474. Upon receiving the response API message, MQTT client 472 may unsubscribe to the topic "/u/1202/d/ABC123/Response", and may forward the response API message to the web service 342. Web service 342 may thereafter translate the topic of the response API message from "/u/1202/d/ABC123/Response" back to the MAC address of the system controller 250a, and communicate the response API message to the API translator 504 over connection 512.

Upon receiving the API response message from the web service 342, API translator 504 may translate the API message to a third-party API message (such as a response message) and forward the third-party API message over connection 510 to gateway 502. Thereafter, gateway 502 may forward the third-party API message to network device 580. Again, other variations are possible.

Similarly, for network device 580 to subscribe to receive API messages published by a system controller, such as system controller 250a, network device 580 may communicate with gateway 502 via communications connection 508 to subscribe to the MAC address of system controller 250a, for example. Upon receiving the subscription request, the gateway 502 may forward the request to a respective API translator 504 via a respective connection 510, which may then forward the request over a respective connection 512 to the web service 342, translating the request if necessary. Alternatively, the gateway 502 may forward the subscription request directly to the web service. Regardless, the operation flow may then proceed as similarly discussed with respect to FIG. 3, for example. As the web service 342 receives via connection 334 from data aggregator 310 API messages published by system controller 250a, the web service may determine that a network device, such as network device 580, has subscribed to receive these API messages as discussed herein. The web service 342 may in turn then forward these API messages (together with its associated topic and/or MAC address, for example) to a respective API translator 504 via a respective connection 510. Alternatively, the web service 342 may forward these API messages to the worker service 344 (such as through message queue 348), which may in turn forward the API messages (together with its associated topic and/or MAC address, for example) to a respective API translator 504 via a respective connection 510. Other variations are possible. Upon receiving an API message from the web service 342, API translator 504 may translate the API message to a third-party API message and forward the third-party API message over a respective connection 510 to gateway 502. Thereafter, gateway 502 may forward the third-party API message to network device 580. In communicating the third-party API message to a network device, the message may include the topic associated with the API message and/or the MAC address of the respective system controller 250a. Again, other variations are possible.

As indicated above, according to the example shown in FIG. 5 gateway 502 and API translator(s) 504 may be specific to a particular third-party API. According to a further aspect of system 500, the system may support multiple different third-party APIs. Here, system 500 may include multiple instances/pairs of gateway 502 and API translator(s) 504, with each gateway/API translator(s) pair supporting a respective third-party API. Depending on which API is used by a network device 580, the device may communicate with a corresponding gateway (e.g., each gateway may have a respective address/URL to which the network device communicates).

According to one specific example, one or more of gateway 502 and API translator(s) 502 may be provided by Amazon Web Services, where gateway 502 may be an Amazon API Gateway, and where each respective instance of an API translator may be a respective Lambda function configured to perform API translation as discussed herein and to communicate with web server 340 as discussed herein. Here, the Amazon API Gateway may expose endpoints to network devices 580, and Lambda functions that are configured as described herein may be assigned to respective gateway endpoints.

Referring now to a still further aspect of systems 300, 400, and 500, as discussed herein web server 340 may treat/use the MAC address, for example, of the system controllers 250a and 250b as topics or channels that network devices 380 and 580 may subscribe to, and/or publish messages to, for example. The subscription database 346 may include the MAC address of the system controllers, and may associate with this address one or more of the topics used by the system controllers 250a and 250b, as shown by callout 350. Again, this is one example.

According to a further example, authorization/access tokens may also be associated with respective system controllers 250a and 250b, and these tokens then associated with one or more of the topics used by the system controllers, with systems 300, 400, and 500 using the tokens in a similar way as to how MAC addresses may be used as described herein. For example, for security purposes in order for a network device 380 or 580 (i.e., third-party) to communicate with web server 340 or gateway 502 to gain access to a user environment 202a or 202b/load control system 210a or 210b, the network device may need to include with the HTTP messages, for example, an authorization/access token that can be used by web server 340 and/or gateway 502 to ensure the network device is permitted access to a user environment 202a or 202b/load control system 210a or 210b. A user (such as a homeowner) of the user environments/load control systems may obtain such tokens using, for example, an OAuth (e.g., OAuth 2.0) based service. Such a service may be provided separate from systems 300, 400, and 500. In the process of the user obtaining such a token, it may be stored in the subscription database 346, for example, and also provided to the third-party and used by the third-party and the web server 340 and/or gateway 502 for authentication/authorization purposes.

In this aspect, authorization tokens may be viewed as being associated with users. According to an aspect of systems 300, 400, and 500 these tokens may also be associated with system controllers. For example, assume that a user/homeowner of user environment 202*a* obtains a token "XYZ123" through an OAuth based service and assume that a user/homeowner of user environment 202*b* obtain a token "XYZ456" through an OAuth based service. In addition to using these tokens for security purposes, these tokens may be stored, for example, in the subscription database 346 (or alternatively, stored in another database such as an authorization database with database 346 having links to the tokens as stored in the authorization database) and associated with the respective system controllers 250*a* and 250*b* and thus associated with one or more of the topics used by the system controllers, as shown in callout 350 of FIG. 5.

As discussed with respect to system 300 of FIG. 3, in order for a network device 380 to receive API messages published by system controller 250*a*, for example, it may subscribe to MAC address "A1:B1:C1:D1:E1:F1" as discussed herein. With respect to authorization tokens, as the network device 380 communicates an HTTP message to the web server 340 to subscribe to receive API messages from system controller 250*a*, the web server 340 may treat/use the authorization token within the HTTP message (i.e., "XYZ123") as a request to subscribe to the authorization token, with system 300 now using the token in a similar way to how it used MAC addresses in order to determine that API messages published by the system controller 250*a* should be forwarded to the network device.

Similarly, as discussed with respect to system 400 of FIG. 4, in order for a network device 380 to communicate an API message to system controller 250*a*, for example, it may publish the message to the MAC address of the system controller. With respect to authorization tokens, as the network device communicates an HTTP message to the web server to publish an API message to the system controller 250*a*, the web server 340 may treat/use the authorization token within the HTTP message (i.e., "XYZ123") as a request to publish the API message to the authorization token, with system 400 now using the token in a similar way to how it used MAC addresses in order to communicate API messages with the system controller 250*a*.

Similarly, as discussed with respect to system 500 of FIG. 5, in order for a network device 580 to communicate a third-party API message to system controller 250*a*, for example, it may communicate the MAC address of the system controller to the gateway 502. With respect to authorization tokens, as the network device 580 communicates an HTTP message (that includes the third-party API message) to the gateway, the gateway may forward the authorization token from the HTTP message (i.e., "XYZ123") to the API translator 504, which may translate the third-party API message to an API message. As the API translator 504 communicates an HTTP message to the web server 340 to publish the API message to the system controller 250*a*, it may include the token with the HTTP message (e.g., for authorization purposes). The web server 340 may thereafter treat/use the authorization token within the HTTP message (i.e., "XYZ123") as a request to publish the API message to the authorization token, with system 500 now using the token in a similar way to how it used MAC addresses in order to communicate API messages with the system controller 250*a*. Authorization tokens may also be used in a similar fashion in system 500 for a network device 580 to subscribe to receive API message published by a system controller. Again, other example process flows are possible.

In general, one will recognize that functions and operations described herein as the message broker 370, data aggregator 310, and web server 340 may each be performed on different computing devices or the same computing device or some combination thereof. One or more of these modules may also be cloud based systems. Similarly, one will recognize that functions and operations described herein as being performed by the message broker 370, data aggregator 310, or web server 340 may be performed by the other modules. For example, web server 340 may provide filters 316 rather than the data aggregator 310. Furthermore, while functions and operations are described herein as being performed by the message broker 370, data aggregator 310, and web server 340, functions and operations may be performed by additional modules. For example, the web service 342 and the worker service 344 may be distributed across multiple computing devices. Subscription database 346 may be a database management system separate from the web server 340, etc. Other variations are possible.

Reference is now made to one example process as described herein. While this example is described as a sequence of operations, not all operations may be necessary, additional and/or other operations may be included, and the order of the operations may vary. According to this example, a system may be configured to maintain a database configured to store entries corresponding to a plurality of load control systems including a first load control system and a second load control system. Each of the plurality of load control systems may be configured to control electrical loads for a respective environment. Each of the plurality of load control system may have a value and an identifier associated with it. The database may be configured for each of the plurality of load control systems to associate the value of the load control system with the identifier of the load control system. The first load control system may include a first value and a first identifier, and the second load control system may include a second value and a second identifier. The first load control system may be configured to communicate messages related to events that occur in the first load control system, and the second load control system may be configured to communicate messages related to events that occur in the second load control system. The system may receive from a network device a request to receive messages communicated by the first load control system. The request may include the first value associated with the first load control system. The system may receive a first message communicated by the first load control system. The first message may have associated with it the first identifier of the first load control system. Based at least in part on the request including the first value and the first message having associated with it the first identifier, the system may determine that the network device requested to receive the first message communicated by the first load control system. Based at least in part on determining that the network device requested to receive the first message, the system may communicate the first message to the network device.

According to another and/or additional example, the system receiving the request from the network device may include the system receiving the request via an HTTP based interface, and the system communicating the first message to the network device may include the system communicating the first message via an HTTP based interface.

According to another and/or additional example, the first load control system may be configured to communicate the first message using a message based interface. According to another and/or additional example, the first load control system may be configured to communicate the first message to a message broker. Additionally, the system receiving the first message communicated by the first load control system may include the system receiving the first message via the message broker. The message broker may be configured to communicate the first message to a message queue. Additionally, the system receiving the first message via the message broker may include the system receiving the first message via the message queue.

According to another and/or additional example, the value associated with each of the plurality of load control systems may include at least one of a communications address, a media access control address, an authorization token, and a random value.

According to another and/or additional example, the system may also be configured to receive a second message communicated by the second load control system. The second message may have associated with it the second identifier of the second load control system. The system may determine that there are no requests to receive messages communicated by the second load control system. Based at least in part on determining that there are no requests to receive messages communicated by the second load control system, the system discard the second message.

According to another and/or additional example, the system may be configured to write the first message to a message queue based at least in part on determining that the network device requested to receive the first message. Additionally, the system communicating the first message to the network device may include the system reading the first message from the message queue and communicating the read first message to the network device.

According to another and/or additional example, the network device may include a first network device. The system may be further configured to receive from a second network device a request to receive messages communicated by the second load control system. The request from the second network device may include the second value associated with the second load control system. The system may receive a third message communicated by the second load control system. The third message may have associated with it the second identifier of the second load control system. Based at least in part on the request from the second network device including the second value and the third message having associated with it the second identifier, the system may determine that the second network device requested to receive the third message communicated by the second load control system. Based at least in part on determining that the second network device requested to receive the third message, the system may communicate the third message to the second network device. According to another and/or additional example, the first network device may not request to receive messages communicated by the second load control system. The system may not communicate the third message to the first network device based at least in part on the first network device not requesting to receive messages communicated by the second load control system.

According to another and/or additional example, in addition to the first message, the system may be configured to receive a plurality of messages communicated by the first load control system. Each of the plurality of messages may have associated with it the first identifier of the first load control system. Based at least in part on the request from the first network including the first value and each of the plurality of messages having associated with it the first identifier, the system may determine that the first network device requested to receive the plurality of messages communicated by the first load control system. Based at least in part on determining that the first network device requested to receive the plurality of messages, the system may communicate the plurality of messages to the first network device.

According to another and/or additional example, the system may be configured to receive from the first network device a request to communicate a fourth message to the first load control system. The request to communicate the fourth message may include the first value associated with the first load control system. Based at least in part on the request to communicate the fourth message including the first value, the system may associate the fourth message with the first identifier associated with the first load control system. The system may communicate to the first load control system the fourth message together with the first identifier associated with the first load control system.

According to another and/or additional example, the system communicating to the first load control system the fourth message together with the first identifier associated with the first load control system may include the system communicating the fourth message together with the first identifier to a message broker that is configured to communicate the fourth message to the first load control system. According to another and/or additional example, the system may receive from the message broker a fifth message that is communicated by the first load control system to the message broker and is responsive to the fourth message. The fifth message may have associated with it the first identifier of the first load control system. The system may communicate the fifth message to the first network device. According to another and/or additional example, the system may be configured to communicate a request to the message broker to forward messages communicated by the first load control system to the message broker. The system receiving from the message broker the fifth message may include the system receiving the fifth message from the message broker based at least in part on communicating the request to the message broker to forward messages communicated by the first load control system. According to another and/or additional example, subsequent to receiving the fifth message, the system may communicate a request to the message broker to stop forwarding messages communicated by the first load control system. According to another and/or additional example, the system receiving the request to communicate the fourth message to the first load control system may include the system receiving the request via an HTTP based interface, and the system communicating the fifth message to the first network device may include the system communicating the fifth message via an HTTP based interface. According to another and/or additional example, the first load control system may be configured to communicate the first message to the message broker. The system receiving the first message communicated by the first load control system may include the system receiving the first message via the message broker. According to another and/or additional example, the system receiving the first message via the message broker may include the system receiving the first message via the message broker via a first communications connection, and the system receiving the fifth message from the message broker may include the system receive the fifth message from the message broker via a second communications connection that is different from the first communications connection.

According to another and/or additional example, the first load control system may be configured to publish messages to the message broker using a first topic and may be configured to subscribe with the message broker to receive messages using a second topic. The first topic and the second topic may each include the first identifier associated with the first load control system and a topic value, where the topic value may be different for the first and second topics. The database may be configured to associate the first value of the first load control system with the first topic and with the second topic. The first message communicated by the first load control system may have the first topic associated with it. The system determining that the first network device requested to receive the first message may include the system correlating the first topic with the first value. The system associating the fourth message with the first identifier may include the system associating the fourth message with the second topic, and the system communicating the fourth message together with the first identifier to the message broker may include the system communicating the fourth message together with the second topic to the message broker.

One will recognize that this is one example and other examples are possible. One will also recognize that the use of first, second, third, etc. herein is meant to distinguish between different messages, load control systems, etc., for example, and not meant to imply a minimum or maximum number of such messages, load control systems, etc., for example.

Reference is now made to another example process as described herein. While this example is described as a sequence of operations, not all operations may be necessary, additional and/or other operations may be included, and the order of the operations may vary. According to this example, a system may be configured to receive from a network device a request to receive messages communicated by a load control system. The request may include a subscription request to a channel associated with the load control system. The load control system may be configured to control electrical loads for an environment. The load control system may be configured to publish messages to a message broker using a first topic and may be configured to receive messages from the message broker by subscribing with the message broker to a second topic. The system may receive via the message broker a first message communicated by the load control system. The first message may have the first topic associated with it, and the first message may be received via an HTTP interface. The system may determine that the first topic associated with the first message is correlated to the channel. Based at least in part on determining that the first topic associated with the first message is correlated to the channel, the system may determine that the network device requested to receive the first message communicated by the load control system. Based at least in part on determining that the network device requested to receive the first message, the system may communicate the first message to the network device.

According to another and/or additional example, the system may be further configured to receive from the network device a request to communicate a second message to the load control system. The request to communicate the second message may include the channel associated with the load control system. Based at least in part on the request to communicate the second message, the system may associate the second message with the second topic. The system may communicate the second message to the message broker by publishing the second message to the message broker using the second topic. The message broker may be configured to forward the second message to the load control system based at least in part on the load control system subscribing with the message broker to the second topic. The system may communicate a request to the message broker to forward messages published by the load control system to the first topic by subscribing with the message broker to the first topic. The system may receive from the message broker a third message that is published by the load control system to the message broker using the first topic. Subsequent to receiving the third message, the system may communicate a request to the message broker to unsubscribe to the first topic. The system may communicate the third message to the network device.

According to another and/or additional example, subsequent to communicating the request to the message broker to unsubscribe to the first topic, the system may be further configured to receive via the message broker a fourth message communicated by the load control system. The fourth message may have the first topic associated with it. The system may determine that the first topic associated with the fourth message is correlated to the channel. Based at least in part on determining that the first topic associated with the fourth message is correlated to the channel, the system may determine that the network device requested to receive the fourth message communicated by the load control system. Based at least in part on determining that the network device requested to receive the fourth message, the system may communicate the fourth message to the network device. The system may be configured to use an HTTP based interface to communicate with the network device.

According to another and/or additional example, the channel may be at least one of a communications address associated with the load control system, a media access control address associated with the load control system, an authorization token, and a random value.

According to another and/or additional example, the system may receive the first and third messages via different communication connections.

One will recognize that this is one example and other examples are possible. One will also recognize that the use of first, second, third, etc. herein is meant to distinguish between different messages and topics, for example, and not meant to imply a minimum or maximum number of such messages and topics, for example.

Reference is now made to another example process as described herein. While this example is described as a sequence of operations, not all operations may be necessary, additional and/or other operations may be included, and the order of the operations may vary. According to this example, a system may be configured to receive from a network device a request to subscribe to a channel associated with a first of a plurality of load control systems. Each of the plurality of load control systems may be configured to control electrical loads for a respective environment. Each of the plurality of the load control systems may be configured to publish messages to a message broker using a respective first topic and may be configured to receive messages from the message broker by subscribing with the message broker to a respective second topic. The channel associated with the first load control system may be correlated to the first and second topics of the first load control system. The request to subscribe to the channel associated with the first load control system may include a request to receive messages published by the first load control system to the first topic. The system may receive from a computing server a set of topics associated with a respective one or more of the plurality of load control systems. The computing server may be configured to receive from the message broker messages published by the one or more of the plurality of load control systems to the message broker, and may be further configured to determine the set of first topics based on the received messages. The received messages may include a first message published by the first load control system to the first topic associated with the first load control system. The set of topics may include the first topic associated with the first load control system. The system may determine that the set of topics received from the computing server includes the first topic associated with the first load control system, and that the network device requested to receive messages published by the first load control system to the first topic. Based at least in part on the determination, the system may communicate an indication to the computing server to forward the first message published by the first load control system. Responsive to communicating the indication, the system may receive from the computing server the first message published by the first load control system. The system may communicate to the network device the first message published by the first load control system.

According to another and/or additional example, the system may receive from the network device a request to communicate a second message to the first load control system, wherein the request to communicate may include the channel associated with the first load control system. Based at least in part on the request to communicate, the system may associate the second message with the second topic associated with the first load control system. The system may communicate the second message to the message broker by publishing the second message to the message broker using the second topic associated with the first load control system. The message broker may be configured to forward the second message to the first load control system based at least in part on the first load control system subscribing with the message broker to the second topic associated with the first load control system.

According to another and/or additional example, the system may communicate a request to the message broker to subscribe to the first topic associated with the first load control system, and based at least in part on communicating the request to the message broker to subscribe to the first topic, may receive from the message broker a third message published by the first load control system to the message broker using the first topic associated with the first load control system. The third-message may be responsive to the second-message. The system may communicate the third message to the network device.

According to another and/or additional example, subsequent to receiving the third-message, the system may communicate a request to the message broker to unsubscribe to the first topic associated with the first load control system.

According to another and/or additional example, the channel may include at least one of a communications address associated with the first load control system, a media access control address associated with the first load control system, an authorization token, and a random value.

According to another and/or additional example the first and third messages may be received via different communication connections.

One will recognize that this is one example and other examples are possible. One will also recognize that the use of first, second, third, etc. herein is meant to distinguish between different load control systems, messages, and topics, for example, and not meant to imply a minimum or maximum number of such load control systems, messages and topics, for example.

In addition to what has been described herein, the methods, processes, and systems may also be implemented in a computer program(s), software, and/or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. An electric load control network interface system, comprising:
    a web server that includes web server controller circuitry configured to:
        translate a hypertext transport protocol (HTTP) message received from a network device to create a first message queuing telemetry transport (MQTT) message;
            wherein the HTTP message includes a media access control (MAC) address assigned to a respective system controller included in a plurality of system controllers; and
        cause a publication of the first MQTT message;
            wherein the first MQTT message includes a first topic and uses a unique identifier assigned to the respective system controller; and
        cause a communication of the first MQTT message to message broker circuitry; and
    a message broker that includes message broker controller circuitry configured to:
        determine whether the respective system controller has subscribed to the first topic based on the unique identifier assigned to the respective system controller; and
        publish the first MQTT message responsive to the determination that the respective system controller has subscribed to the first topic.

2. The system of claim 1:
    wherein the message broker controller circuitry to further:
        extract a unique identifier assigned to a network device from a received second MQTT message;
            wherein the second MQTT message includes data representative of the unique identifier and data representative of a second topic;
        determine whether the network device assigned to the unique identifier has subscribed to the second topic; and
        publish the second MQTT message responsive to the determination that the network device has subscribed to the second topic; and
    wherein the web server controller circuitry to further:

translate the second MQTT message received from the message broker controller circuitry to create a second HTTP message that includes the second topic and data representative of a MAC address assigned to the network device; and
cause a communication of the second HTTP message to the network device.

3. The system of claim 2 wherein the web server further comprises:
a subscription data structure that includes data for each of the plurality of system controllers, wherein data for each system controller included in the plurality of system controllers includes:
a media access control (MAC) address associated with the respective system controller; and
the unique identifier associated with the respective system controller; and
wherein to translate the HTTP message received from the network device to create the first MQTT message, the web server controller circuitry to further:
retrieve from the subscription data structure the unique identifier that corresponds to the received MAC address assigned to the respective system controller.

4. The system of claim 3 wherein to translate the second MQTT message received from the message broker controller circuitry to create the second HTTP message, the web server controller circuitry to further:
retrieve from the subscription data structure, the MAC address that corresponds to the received unique identifier assigned to the network device.

5. The system of claim 1 wherein the message broker controller circuitry to further:
store the first MQTT message responsive to the determination that the system controller has subscribed to the first topic.

6. The system of claim 2 wherein the message broker controller circuitry to further:
store the second MQTT message responsive to the determination that the network device has subscribed to the second topic.

7. An electric load control network interface method, comprising:
translating, by controller circuitry, a hypertext transfer protocol (HTTP) message received from a network device to create a first message queuing telemetry transport (MQTT) message;
wherein the HTTP message includes a media access control (MAC) address assigned to a respective system controller included in a plurality of system controllers, the received HTTP message;
causing, by the web server controller circuitry, a publication of a first MQTT message;
wherein the first MQTT message includes a first topic and uses a unique identifier assigned to the respective system controller;
causing, by the controller circuitry, a communication of the first MQTT message to message broker circuitry;
causing, by the controller circuitry, the message broker circuitry to determine whether the respective system controller has subscribed to the first topic based on the unique identifier assigned to the respective system controller; and
causing, by the controller circuitry, the message broker circuitry to publish the first MQTT message responsive to the determination that the respective system controller has subscribed to the first topic.

8. The method of claim 7, further comprising:
causing, by the controller circuitry, the message broker circuitry to extract a unique identifier assigned to a network device from a received second MQTT message;
wherein the second MQTT message includes data representative of the unique identifier and data representative of a second topic;
causing, by the controller circuitry, the message broker circuitry to determine whether the network device assigned to the unique identifier has subscribed to the second topic;
causing, by the controller circuitry, the message broker circuitry to publish the second MQTT message responsive to the determination that the respective network device has subscribed to the second topic;
translating, by the controller circuitry, the second MQTT message received from the message broker circuitry to create a second HTTP message that includes the second topic and data representative of a MAC address assigned to the network device; and
causing, by the controller circuitry, a communication of the second HTTP message to the network device.

9. The method of claim 8 wherein translating the HTTP message received from the network device to create the first MQTT message, further comprises:
retrieving by the controller circuitry, the unique identifier that corresponds to the received MAC address assigned to the respective system controller from a subscription data structure.

10. The method of claim 9 wherein translating the second MQTT message received from the message broker circuitry to create a second HTTP message, further comprises:
retrieving by the controller circuitry, the MAC address that corresponds to the received unique identifier assigned to the network device from the subscription data structure.

11. The method of claim 7, further comprising:
causing, by the controller circuitry, the message broker circuitry to store the first MQTT message responsive to the determination that the system controller has subscribed to the first topic.

12. The method of claim 8, further comprising:
causing, by the controller circuitry, the message broker circuitry to store the second MQTT message responsive to the determination that the network device has subscribed to the second topic.

13. A non-transitory, machine readable, storage device that includes instructions that, when executed by controller circuitry in an electric load control network interface system, causes the controller circuitry to:
translate an HTTP message received from a network device to create a first MQTT message;
wherein the HTTP message includes a media access control (MAC) address assigned to a respective system controller included in a plurality of system controllers;
cause a publication of the first MQTT message;
wherein the first MQTT message includes a first topic and uses a unique identifier assigned to the respective system controller;
cause a communication of the first MQTT message to message broker circuitry;
cause the message broker circuitry to determine whether the respective system controller has subscribed to the first topic based on the unique identifier assigned to the respective system controller; and cause the message broker circuitry to publish the first MQTT message responsive to the determination that the respective system controller has subscribed to the first topic.

14. The non-transitory, machine readable, storage device of claim 13 wherein the instructions, when executed by the controller circuitry, further cause the controller circuitry to:
cause the message broker circuitry to extract a unique identifier assigned to a network device from a received second MQTT message;
wherein the second MQTT message includes data representative of the unique identifier and data representative of a second topic;
cause the message broker circuitry to determine whether the network device assigned to the unique identifier has subscribed to the second topic;
cause the message broker circuitry to publish the second MQTT message responsive to the determination that the network device has subscribed to the second topic;
translate the second MQTT message received from the message broker circuitry to create a second HTTP message that includes the second topic and data representative of a MAC address assigned to the network device; and
cause a communication of the second HTTP message to the network device.

15. The non-transitory, machine readable, storage device of claim 14 wherein the instructions that cause the controller circuitry to translate the HTTP message received from the network device to create the first MQTT message, further cause the controller circuitry to:
retrieve from a subscription data structure, the unique identifier that corresponds to the received MAC address assigned to the respective system controller.

16. The non-transitory, machine readable, storage device of claim 15 wherein the instructions that cause the controller circuitry to translate the second MQTT message received from the message broker circuitry to create the second HTTP message, further cause the controller circuitry to:
retrieve from the subscription data structure, the MAC address that corresponds to the received unique identifier assigned to the network device.

17. The non-transitory, machine readable, storage device of claim 13 wherein the instructions, when executed by the controller circuitry, further cause the controller circuitry to:
cause the message broker circuitry to store the first MQTT message responsive to the determination that the system controller has subscribed to the first topic.

18. The non-transitory, machine readable, storage device of claim 14 wherein the instructions, when executed by the controller circuitry, further cause the controller circuitry to:
cause the message broker circuitry to store the second MQTT message responsive to the determination that the network device has subscribed to the second topic.

* * * * *